(12) United States Patent
Hwang et al.

(10) Patent No.: US 11,576,545 B2
(45) Date of Patent: Feb. 14, 2023

(54) CLEANER

(71) Applicant: LG Electronics Inc., Seoul (KR)

(72) Inventors: Philjae Hwang, Seoul (KR); Mantae Hwang, Seoul (KR); Jungbae Hwang, Seoul (KR); Dongho Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/542,910

(22) Filed: Dec. 6, 2021

(65) Prior Publication Data

US 2022/0087491 A1 Mar. 24, 2022

Related U.S. Application Data

(63) Continuation of application No. 16/328,144, filed as application No. PCT/KR2017/006115 on Jun. 13, 2017, now Pat. No. 11,419,471.

(30) Foreign Application Priority Data

Aug. 25, 2016 (KR) .................... 10-2016-0108320
Dec. 30, 2016 (KR) .................... 10-2016-0183907

(51) Int. Cl.
*A47L 9/28* (2006.01)
*A47L 5/24* (2006.01)
(Continued)

(52) U.S. Cl.
CPC .............. *A47L 9/2884* (2013.01); *A47L 5/24* (2013.01); *A47L 9/1683* (2013.01);
(Continued)

(58) Field of Classification Search
CPC ........ A47L 9/2884; A47L 5/24; A47L 9/1683; A47L 9/2857; A47L 9/322; A47L 9/28;
(Continued)

(56) References Cited

U.S. PATENT DOCUMENTS

2004/0241539 A1 12/2004 Katayama
2007/0264536 A1* 11/2007 Mizoguchi .......... H01M 50/213
429/123
(Continued)

FOREIGN PATENT DOCUMENTS

EP 2215947 8/2010
JP 2003045386 2/2003
(Continued)

OTHER PUBLICATIONS

Office Action in United States U.S. Appl. No. 17/542,911, dated Mar. 4, 2022, 15 pages.
(Continued)

*Primary Examiner* — Katina N. Henson
(74) *Attorney, Agent, or Firm* — Fish & Richardson P.C.

(57) ABSTRACT

The present invention relates to a cleaner. A cleaner according to an aspect may include a battery housing and a battery separably coupled to the battery housing. The battery may include a frame, a plurality of battery cells received in the frame, a battery holder surrounding the plurality of battery cells and including a separation wall to divide the plurality of battery cells in a plurality of rows.

20 Claims, 32 Drawing Sheets

(51) Int. Cl.
*A47L 9/16* (2006.01)
*A47L 9/32* (2006.01)
*G05F 1/00* (2006.01)
*H02J 7/00* (2006.01)

(52) U.S. Cl.
CPC .............. *A47L 9/2857* (2013.01); *A47L 9/322* (2013.01); *G05F 1/00* (2013.01); *H02J 7/0045* (2013.01)

(58) Field of Classification Search
CPC ......... G05F 1/00; H02J 7/0045; H02J 7/0013; H02J 7/1423; H01M 10/425; H01M 2010/4271
USPC ............................................... 15/320; 429/92
See application file for complete search history.

(56) References Cited

U.S. PATENT DOCUMENTS

| | | | | |
|---|---|---|---|---|
| 2008/0113262 | A1* | 5/2008 | Phillips | H01M 10/425 |
| | | | | 429/149 |
| 2010/0124693 | A1* | 5/2010 | Kosugi | H01M 50/20 |
| | | | | 429/92 |
| 2013/0122341 | A1 | 5/2013 | Paoli et al. | |
| 2015/0320283 | A1 | 11/2015 | Lee et al. | |
| 2016/0235267 | A1 | 8/2016 | Han et al. | |

FOREIGN PATENT DOCUMENTS

| | | | |
|---|---|---|---|
| JP | 2007305408 | | 11/2007 |
| JP | 2010123299 | | 6/2010 |
| JP | 2014229725 | | 12/2014 |
| JP | 2016131777 | | 7/2016 |
| JP | 2016131777 | A * | 7/2016 |
| KR | 101552437 | | 9/2015 |

OTHER PUBLICATIONS

Office Action in United States U.S. Appl. No. 17/542,957, dated Feb. 8, 2022, 18 pages.

* cited by examiner

CLEANER

CROSS-REFERENCE TO RELATED APPLICATIONS

This application is a continuation of U.S. application Ser. No. 16/328,144, filed on Feb. 25, 2019, which is a National Stage application under 35 U.S.C. § 371 of International Application No. PCT/KR2017/006115, filed on Jun. 13, 2017, which claims the benefit of Application No. 10-2016-0183907, filed on Dec. 30, 2016 and Application No. 10-2016-0108320, filed on Aug. 25, 2016. The disclosures of the prior applications are incorporated by reference in their entirety.

TECHNICAL FIELD

The present disclosure relates to a cleaner.

BACKGROUND

In general, a vacuum cleaner is a device that suctions dust and dirt on surfaces to be cleaned, using a suction motor in the main body, and then filters the dust and dirt in the main body.

Cleaners may be classified into a manual cleaner that a user moves in person for cleaning and an automatic cleaner that automatically moves for cleaning.

Manual cleaners may fall into, depending on the types, a canister cleaner, an upright cleaner, a handy cleaner, and a stick cleaner.

Meanwhile, in the related art, a handheld vacuum cleaner has been disclosed in Korean Patent No. 10-1127088 (registered on 8 Mar. 2012).

The handheld vacuum cleaner includes a suction pipe, an airflow generator, a cyclone, a power supply, and a handle.

The cyclone is disposed between the handle and the suction pipe, the airflow generator is disposed right over the handle, and the power supply is disposed right under the handle. Accordingly, the airflow generator and the power supply are disposed behind the cyclone.

The power supply includes a plurality of battery cells laid in parallel. There is a problem in the prior art document in that it is required to disassemble the cleaner in order to separate the power supply from the cleaner.

Further, since the battery cells are laid in parallel on one layer, there is a problem in that the volume occupied by the power supply is large and the maximum voltage that the power supply can supply to a suction motor is small.

SUMMARY

The present disclosure provides a cleaner that users can more conveniently use by distributing the overall weight.

The present disclosure provides a cleaner in which the maximum charging voltage of a battery can be increased and that can be made compact.

The present disclosure provides a cleaner of which the performance of cooling a battery is improved.

The present disclosure provides a cleaner in which battery cells can be separately arranged in a plurality of lines.

A cleaner of present invention includes a battery housing and a battery separably coupled to the battery housing.

The cleaner may further include a suction motor generating a suction force and a handle having an operation unit for inputting instructions to turn on or off the suction motor.

The battery housing may be disposed at a side of the handle. For example, the battery housing may be disposed under the handle and the battery may be separated downward from the battery housing.

The battery may include a frame, a plurality of battery cells received in the frame, a battery holder surrounding the plurality of battery cells and including a separation wall to divide the plurality of battery cells in a plurality of rows.

A direction in which the battery is mounted in the battery housing may be parallel with an extension direction of the plurality of battery cells in a state in which the plurality of battery cells is supported by a battery holder.

The battery may further include a battery management unit to manage voltage of the plurality of battery cells; and a barrier disposed between the plurality of battery cells and the battery management unit.

The battery holder may include: a first holder disposed at the upper portion of the separation wall and surrounding the upper portions of the plurality of battery cells; and a second holder disposed at the lower portion of the separation wall and surrounding the lower portions of the plurality of battery cells.

The holders each may include: a plurality of first cell cases surrounding the entire circumference of some of the plurality of battery cells; and a plurality of second cell cases surrounding only portions of the circumference of another of the plurality of battery cells such that the battery cells are arranged in a plurality of rows in a zigzag pattern.

In this embodiment, two adjacent second cell cases are spaced apart from each other with respect to the separation wall there between and a distance between the centers of two adjacent second cell cases is shorter than a distance between the centers of two adjacent first cell cases.

In order to reduce the size of the battery holder, the holders each may further include a third cell case disposed an area corresponding to the area between plurality of second cell cases and surrounding portions of the circumference of another of the plurality of battery cells.

The frame may include contact ribs that can come in contact battery cells exposed out of the second cell case and the third cell case in order to prevent the battery cells supported by the battery holder from moving in the frame.

The contact ribs may be rounded with a curvature corresponding to the curvature of the battery cells in order to increase the contact area between the battery cells and the contact rib.

The battery management unit may include a circuit board, the barrier may include a plate spaced apart from the circuit board, and an extension direction of each of the plurality of battery cells may cross the circuit board and the plate.

The barrier may include a guide protrusion protruding from the plate to guide the position to be fastened to the circuit board, and a fastening boss to which a fastener passing through the circuit board is fastened, in order to improve work efficiency when the circuit board and the barrier are combined.

The circuit board may include a protrusion through-hole through which the guide protrusion passes, and a fastening hole through which the fastener passes.

The cleaner may further include: an upper conductor connecting two battery cells over the plurality of battery cells; and an upper conductive plate connected to the upper conductor and connected to the battery management unit.

The plate may include a first guide portion guiding the upper conductive plate to the circuit board and the circuit board may include a second guide portion through which the upper conductive plate passes so that the upper conductive plate can be connected to the battery management unit.

The cleaner may further include: a lower conductor connecting two battery cells under the plurality of battery cells; a lower conductive plate connected to the lower conductor; and a wire connecting the lower conductive plate and the battery management unit.

The plate may include a first wire guiding portion guiding the wire and the circuit board may include a second wire guiding portion guiding the wire so that the wire can be connected with the battery management unit.

The frame may include a movement prevention rib protruding from the inner side to prevent movement of the barrier and the battery management unit, and the circuit board may include a rib slot through which the movement prevention rib passes. The barrier may include a rib receiving groove in which the rib passing through the rib slot is received.

The frame may include a movement prevention rib protruding from the inner side to prevent movement of the barrier and the battery management unit, the barrier may include a reinforcing rib extending upward from the edge of the plate, and the movement prevention rib may be seated on the reinforcing rib.

According to the proposed invention, since the battery can be separated from the battery housing, it is possible to separately charge the battery on a cradle.

Further, since the battery cells are arranged in a zigzag pattern, even if the number of the battery cells is increased, the degree of increasing in size of the battery is small, so the battery can be made compact and the maximum charging volume can be increased.

Further, since the holders surrounding the battery cells are disposed to surround portions of the battery cells, the size of the battery holders can be reduced, so the battery can be made compact.

Further, even if the battery cells in any one row of the plurality of rows are burned, it is possible to prevent the battery cells in other rows from being burned by the separation wall.

DETAILED DESCRIPTION

Figure 1:
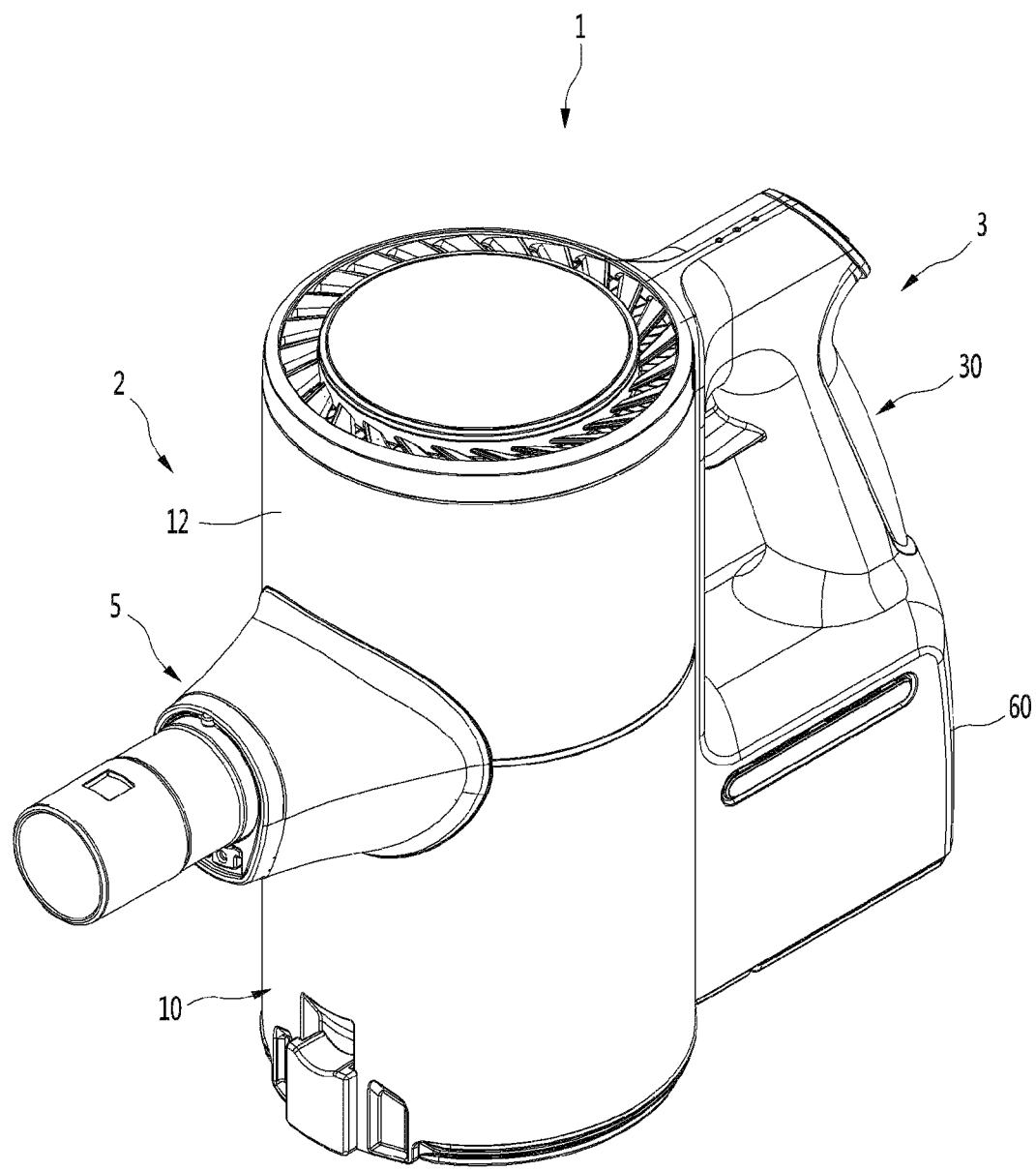
FIG. 1 is a perspective view of a cleaner according to an embodiment of the present invention.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b)

may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed there between.

Figure 2:
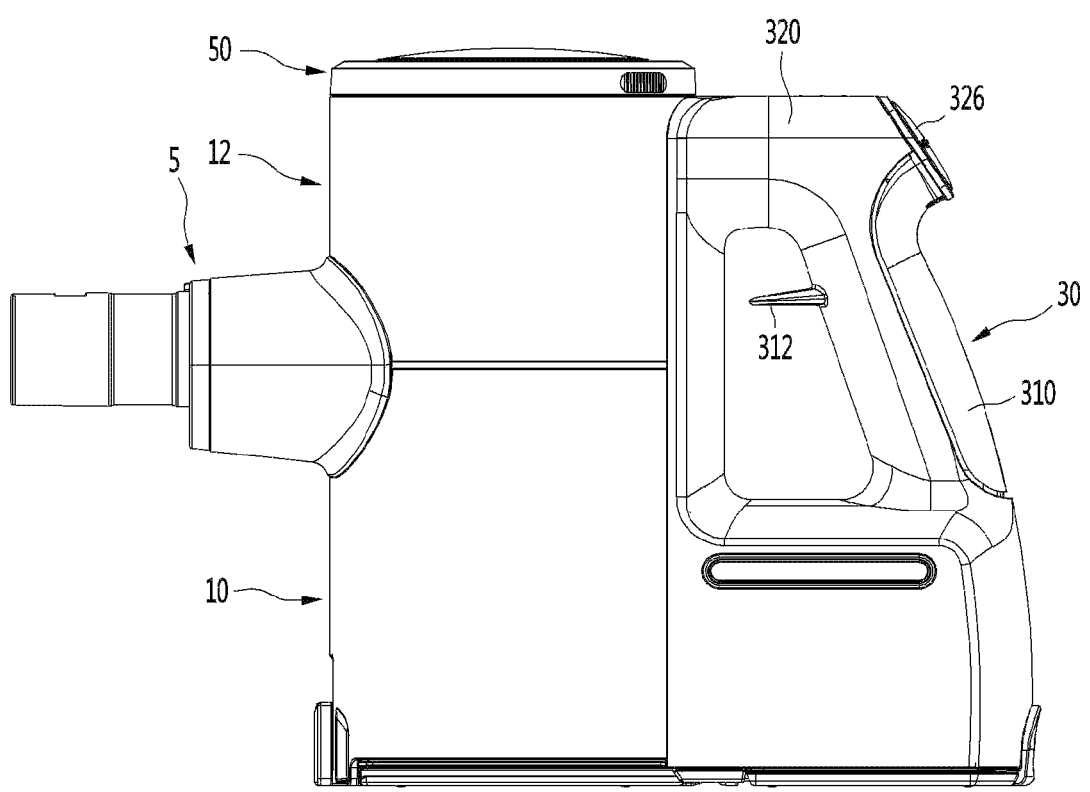
FIG. 2 is a side view of the cleaner according to an embodiment of the present invention.
Figure 3:
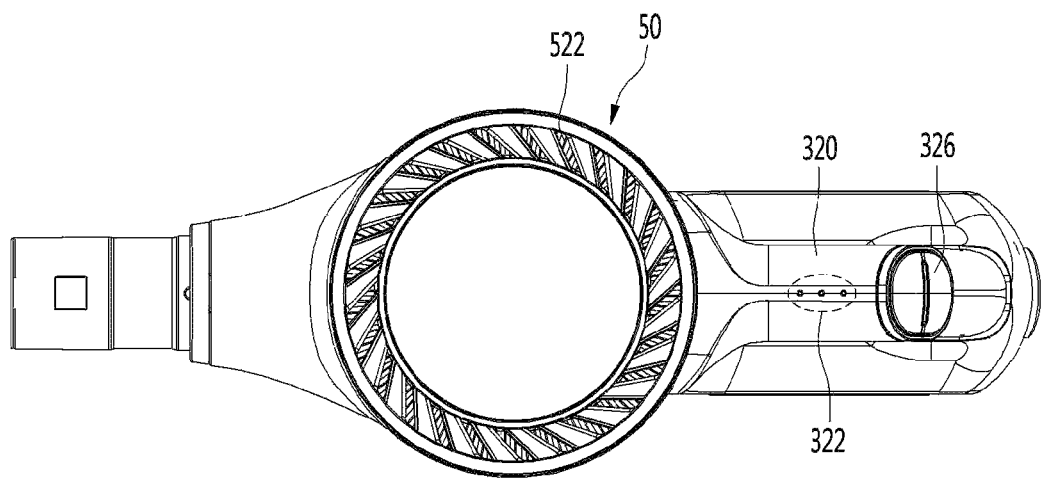
FIG. 3 is a plan view of the cleaner according to an embodiment of the present invention.
Figure 4:
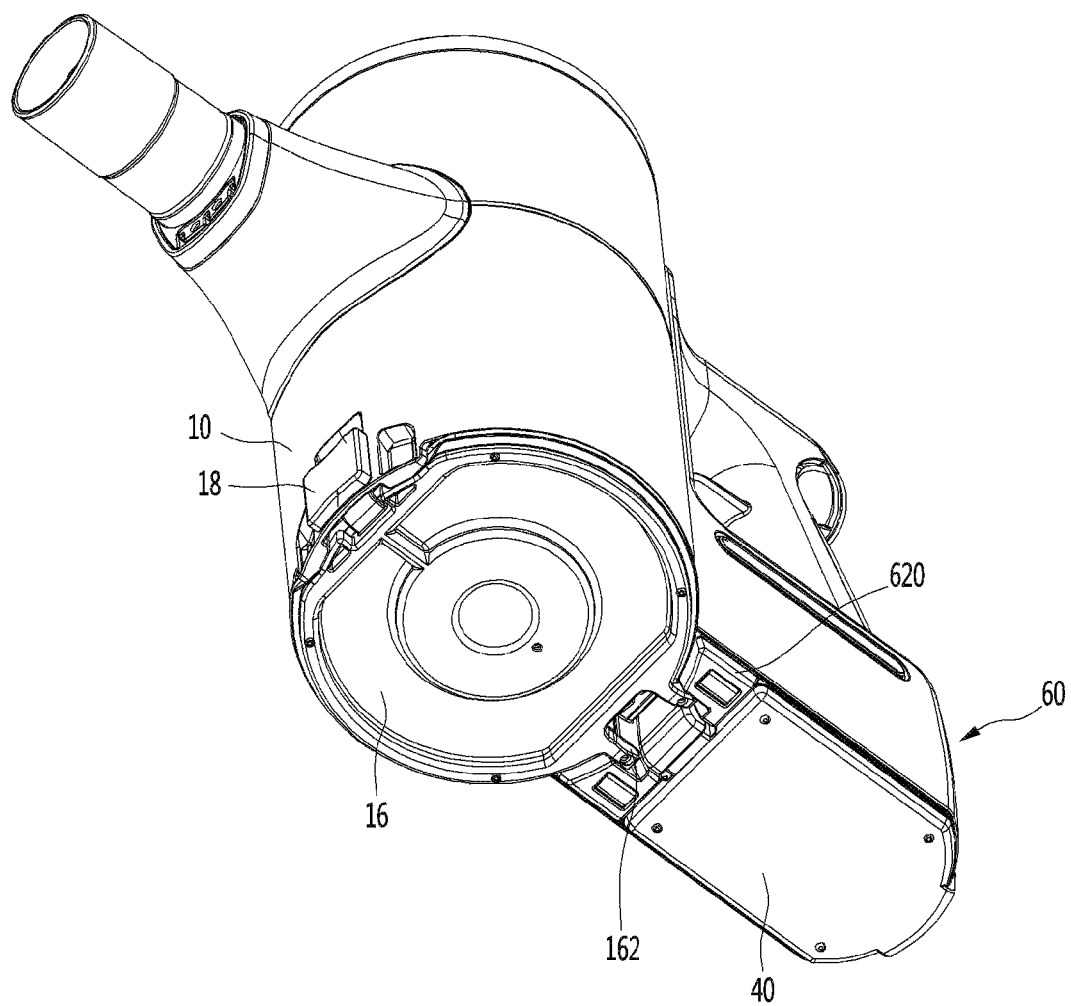
FIG. 4 is a perspective view of the cleaner according to an embodiment of the present invention when seen from under the cleaner.
Figure 5:
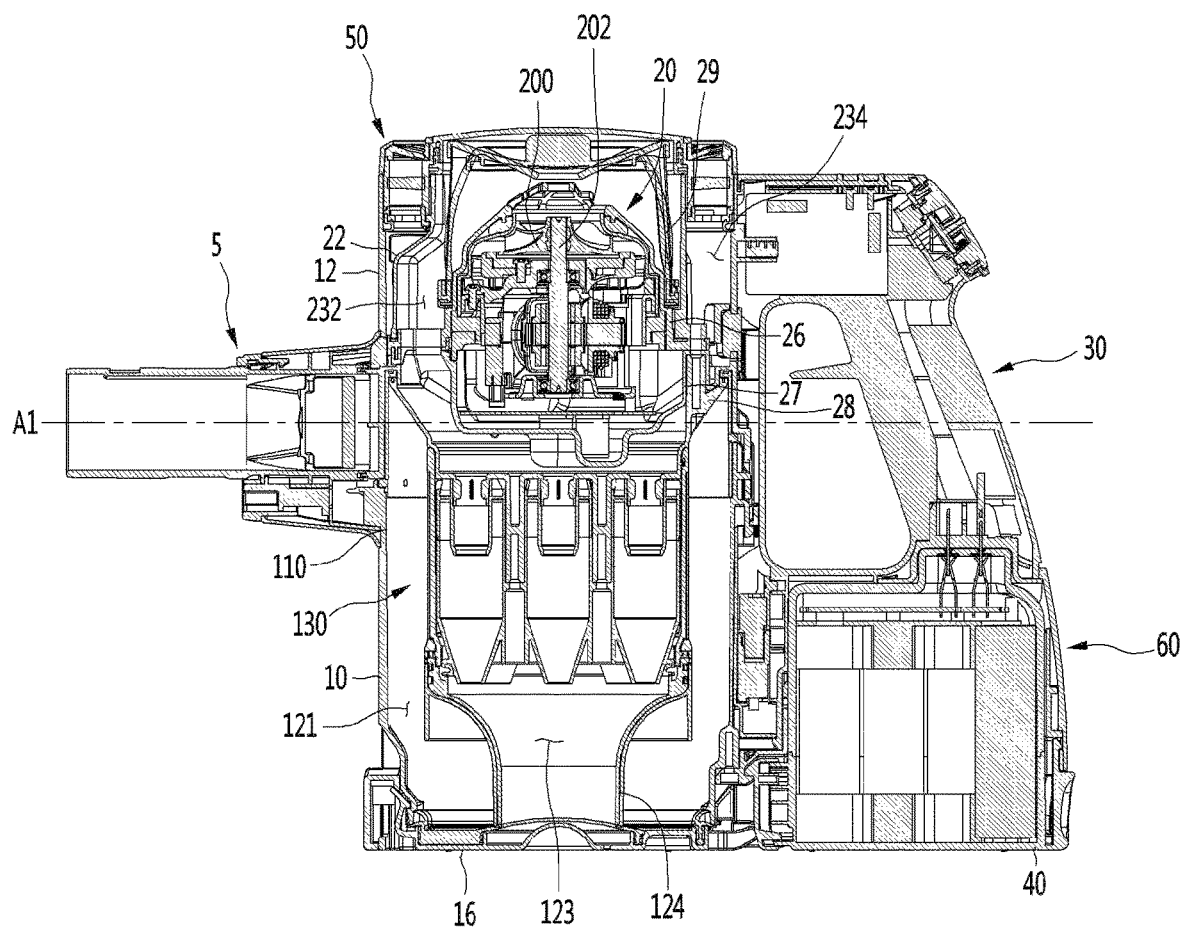
FIG. 5 is a vertical cross-sectional view of the cleaner according to an embodiment of the present invention.

FIG. 1 is a perspective view of a cleaner according to an embodiment of the present invention, FIG. 2 is a side view of the cleaner according to an embodiment of the present invention, FIG. 3 is a plan view of the cleaner according to an embodiment of the present invention, FIG. 4 is a perspective view of the cleaner according to an embodiment of the present invention when seen from under the cleaner, and FIG. 5 is a cross-sectional view of the cleaner according to an embodiment of the present invention.

Referring to FIGS. 1 to 5, a cleaner 1 according to an embodiment of the present invention may include a main body 2.

The cleaner 1 may further include a suction inlet 5 coupled to the front of the main body 2. The suction inlet 5 can guide air containing dust into the main body 2.

The cleaner 1 may further include a handle unit 3 coupled to the main body 2. The handle unit 3 may be positioned opposite to the suction inlet 5 on the main body 2.

That is, the main body 2 may be disposed between the suction inlet 5 and the handle unit 3.

The main body 2 may include a first body 10 and a second body 12 on the first body 10. The first body 10 and the second body 12 may be directly combined or may be indirectly combined through an intermediate member.

The first body 10 and the second body 12 may be, though not limited thereto, formed in a cylindrical shape.

The first body 10 and the second body 12 are open at the top and the bottom, respectively. That is, the bodies 10 and 12 may have a top opening and a bottom opening, respectively.

The suction inlet 5 may be coupled to the main body 2 such that the center of the suction inlet 5 is positioned approximately at the boundary between the first body 10 and the second body 12.

The main body 2 may further include a dust separation unit that separates dust from air suctioned through the suction inlet 5.

The dust separation unit may include a first cyclone unit 180 that can separate dust, for example, using cyclonic flow. The first body 10 includes the first cyclone unit 180 in this configuration.

The air and dust suctioned through the suction inlet 5 helically flow along the inner side of the first cyclone unit 180.

The axis of the cyclonic flow in the first cyclone unit 110 may vertically extend.

The dust separation unit may further include a second cyclone unit 130 that secondarily separates dust from the air discharged out of the first cyclone unit 110. The second cyclone unit 130 may be disposed inside the first cyclone unit 110 to minimize the size of the dust separation unit. The second cyclone unit 130 may include a plurality of cyclone bodies arranged in a raw.

As another example, the dust separation unit may include one cyclone unit, in which the axis of the cyclonic flow may also vertically extend.

The first body 10 functions as a dust container that stores dust separated by the cyclone units 110 and 130.

The main body 2 may further include a body cover 16 for opening/closing the bottom of the first body 10. The body cover 16 can open/close the first body 10 by being rotated.

At least a portion of the second cyclone unit 130 may be positioned inside the first body 10.

A dust storage guide 124 that guides the dust separated by the second cyclone unit 130 to be stored may be disposed in the first body 10. The dust storage guide 124 may be coupled to the bottom of the second cyclone unit 130 in contact with the top of the body cover 16.

The dust storage guide 124 may divide the internal space of the first body 10 into a first dust storage part 121 where the dust separated by the first cyclone unit 110 is stored and a second dust storage part 123 where the dust separated by the second cyclone unit 130 is stored.

The internal space of the dust storage guide 124 is the second dust storage part 123 and the space between the dust storage guide 124 and the first body 10 is the first dust storage part 121.

The body cover 16 can open/close both of the first dust storage part 121 and the second dust storage part 123.

The cleaner 1 may further include a suction motor 20 for generating suction force and a battery 40 for supplying power to the suction motor 20.

The suction motor 20 may be disposed in the second body 12. At least a portion of the suction motor 20 may be disposed over the dust separation unit. Accordingly, the suction motor 20 is disposed over the first body 10.

The suction motor 20 may communicate with an outlet of the second cyclone unit 130.

To this end, the main body 2 may further include a discharge guide 28 connected to the second cyclone unit 130 and a flow guide 22 that communicates with the discharge guide 28.

For example, the discharge guide 28 is disposed on the second cyclone unit 130 and the flow guide 22 is disposed over the discharge guide 28.

Further, at least a portion of the suction motor 20 is positioned inside the flow guide 22.

Accordingly, the axis of the cyclonic flow in the first cyclone unit 110 may pass through the suction motor 20.

When the suction motor 20 is disposed over the second cyclone unit 130, the air discharged from the second cyclone unit 130 can flow directly to the suction motor 20, so the channel between the dust separation unit and the suction motor 20 can be minimized.

The suction motor 20 may include a rotary impeller 200. The impeller 200 may be fitted on a shaft 202. The shaft 202 is vertically disposed.

An extension line from the shaft 202 (which may be considered as the rotational axis of the impeller 200) may pass through the first body 10. The rotational axis of the impeller 200 and the axis of the cyclonic flow in the first cyclone unit 180 may be on the same line.

According to the present invention, there is the advantage that the path through which the air discharged from the dust separation unit, that is, the air discharged upward from the second cyclone unit 130 flows to the suction motor 20 can be reduced and a change in direction of air can be decreased, so a loss of airflow can be reduced.

As the loss of airflow is reduced, suction force can be increased and the lifetime of the battery 40 for supplying power to the suction motor 20 can be increased.

The cleaner 1 may further include an upper motor housing 26 covering a portion of the top of the suction motor 20 and a lower motor housing 27 covering a portion of the bottom of the suction motor 20.

The suction motor 20 may be disposed inside the motor housings 26 and 27 and the flow guide 22 may be disposed to cover the upper motor housing 26.

At least a portion of the flow guide 22 may be spaced apart from the upper motor housing 26. Further, at least a portion of the flow guide 22 may be spaced apart from the second body 12.

Accordingly, a first air passage 232 is defined by the inner side of the flow guide 22 and the outer side of the upper motor housing 26 and a second air passage 234 is defined by the outer side of the flow guide 22 and the inner side of the second body 12.

The air discharged from the second cyclone unit 130 flows to the suction motor 20 through the first air passage 232 and the air discharged from the suction motor 20 flows through the second air passage 234 and is then discharged outside. Accordingly, the second air passage 234 functions as an exhaust channel.

The handle unit 3 may include a handle 30 for a user to hold and a battery housing 60 under the handle 30.

The handle 30 may be disposed behind the suction motor 20.

As for directions, with respect to the suction motor 20 in the cleaner 1, the direction in which the suction inlet 5 is positioned is the front direction and the direction in which the handle 30 is positioned is the rear direction.

The battery 40 may be disposed behind the first body 10. Accordingly, the suction motor 20 and the battery 40 may be arranged not to vertically overlap each other and may be disposed at different heights.

According to the present invention, since the suction motor 20 that is heavy is disposed ahead of the handle 30 and the battery 40 that is heavy is disposed behind the handle 30, so weight can be uniformly distributed throughout the cleaner 1. It is possible to prevent injuries to the user's wrist when a user cleans with the handle 30 in his/her hand. That is, since the heavy components are distributed at the front and rear portions and at different heights in the cleaner 1, it is possible to prevent the center of gravity of the cleaner 1 from concentrating on any one side.

Since the battery 40 is disposed under the handle 30 and the suction motor 20 is disposed in front of the handle 30, there is no component over the handle 30. That is, the top of the handle 30 forms a portion of the external appearance of the top of the cleaner 1.

Accordingly, it is possible to prevent any component of the cleaner 1 from coming in contact with the user's arm while the user cleans with the handle 30 in his/her hand.

The handle 30 may include a first extension 310 extending vertically to be held by a user and a second extension 320 extending toward the suction motor 20 over the first extension 310. The second extension 320 may at least partially horizontally extend.

A stopper 312 for preventing a user's hand holding the first extension 310 from moving in the longitudinal direction of the first extension 310 (vertically in FIG. 2) may be formed on the first extension 310. The stopper 312 may extend toward the suction inlet 5 from the first extension 310.

The stopper 312 is spaced apart from the second extension 320.

Accordingly, a user is supposed to hold the first extension 310, with some of the fingers over the stopper 312 and the other fingers under the stopper 312.

For example, the stopper 312 may be positioned between the index finger and the middle finger.

According to this arrangement, when a user holds the first extension 310, the longitudinal axis A1 of the suction inlet 5 may pass through the user's wrist.

When the longitudinal axis A1 of the suction inlet 5 passes through the user's wrist and the user's arm is stretched, the longitudinal axis A1 of the suction inlet 5 may be substantially aligned with the user's stretched arm. Accordingly, there is the advantage in this state that the user uses minimum force when pushing or pulling the cleaner 1 with the handle 30 in his/her hand.

The handle 30 may include an operation unit 326. For example, the operation unit 326 may be disposed on an inclined surface of the second extension 320. It is possible to input instructions to turn on/off the cleaner (suction motor) through the operation unit 326.

The operation unit 326 may be disposed to face a user. The operation unit 326 may be disposed opposite to the stopper 312 with the handle 30 there between.

The operation unit 326 is positioned higher than the stopper 312.

Accordingly, a user can easily operate the operation unit 326 with his/her thumb with the first extension 310 in his/her hand.

Further, since the operation unit 326 is positioned outside the first extension 310, it is possible to prevent the operation unit 326 from being unexpectedly operated when a user cleans with the first extension 310 in his/her hand.

A display unit 322 for showing operational states may be disposed on the second extension 320. The display unit 322 may be, for example, disposed on the top of the second extension 320. Accordingly, a user can easily check the display unit 322 on the top of the second extension 320 while cleaning. The display 322, for example, can show the remaining capacity of the battery 40 and the intensity of the suction motor.

The display unit 322, though not limited, may include a plurality of light emitting devices. The light emitting devices may be spaced apart from each other in the longitudinal direction of the second extension 320.

The battery housing 60 may be disposed under the first extension 310.

The battery 40 may be detachably received in the battery housing 60. For example, the battery 40 may be inserted into the battery housing 60 from under the battery housing 60.

The rear side of the battery housing 60 and the rear side of the first extension 310 may form a continuous surface. Accordingly, the battery housing 60 and the first extension 310 can be shown like a single unit.

When the battery 40 is inserted in the battery housing 60, the bottom of the battery 40 may be exposed to the outside. Accordingly, when the cleaner 1 is placed on the floor, the battery 40 can be in contact with the floor.

According to this structure, there is the advantage that the battery 40 can be directly separated from the battery housing 60.

Further, since the bottom of the battery 40 is exposed to the outside, the bottom of the battery 40 can come in direct contact with the air outside the cleaner 1, so the battery 40 can be more efficiently cooled.

Referring to FIG. 3, the cleaner 1 may further include a filter unit 50 having air exits 522 for discharging the air that has passed through the suction motor 20. For example, the air exits 522 may include a plurality of openings and the openings may be circumferentially arranged. Accordingly, the air exist 522 may be arranged in a ring shape.

The filter unit 50 may be detachably coupled to the top of the main body 2. The filter unit 50 may be detachably coupled to the second body 12.

When the filter unit 50 is combined with the main body 2, a portion of the filter unit 50 is positioned outside the second body 12. Accordingly, a portion of the filter unit 50 is inserted in the main body 2 through the open top of the main body 2 and the other portion protrudes outside from the main body 2.

The height of the main body 2 may be substantially the same as the height of the handle 30. Accordingly, the filter unit 50 protrudes upward from the main body 2, so a user can easily hold and separate the filter unit 50.

When the filter unit 50 is combined with the main body 2, the air exits 522 are positioned at the upper portion of the filter unit 50. Accordingly, the air discharged from the suction motor 20 is discharged upward from the main body 2.

According to this embodiment, it is possible to prevent the air discharged from the air exits 522 from flowing to a user while the user cleans using the cleaner 1.

The main body 2 may further include a pre-filter 29 for filtering the air flowing into the suction motor 20. The pre-filter 29 may be disposed inside the flow guide 22. Further, the pre-filter 29 is seated over the upper motor housing 16 and may surround a portion of the upper motor housing 26. That is, the upper motor housing 26 may include a filter support for supporting the pre-filter 29.

Figure 6:
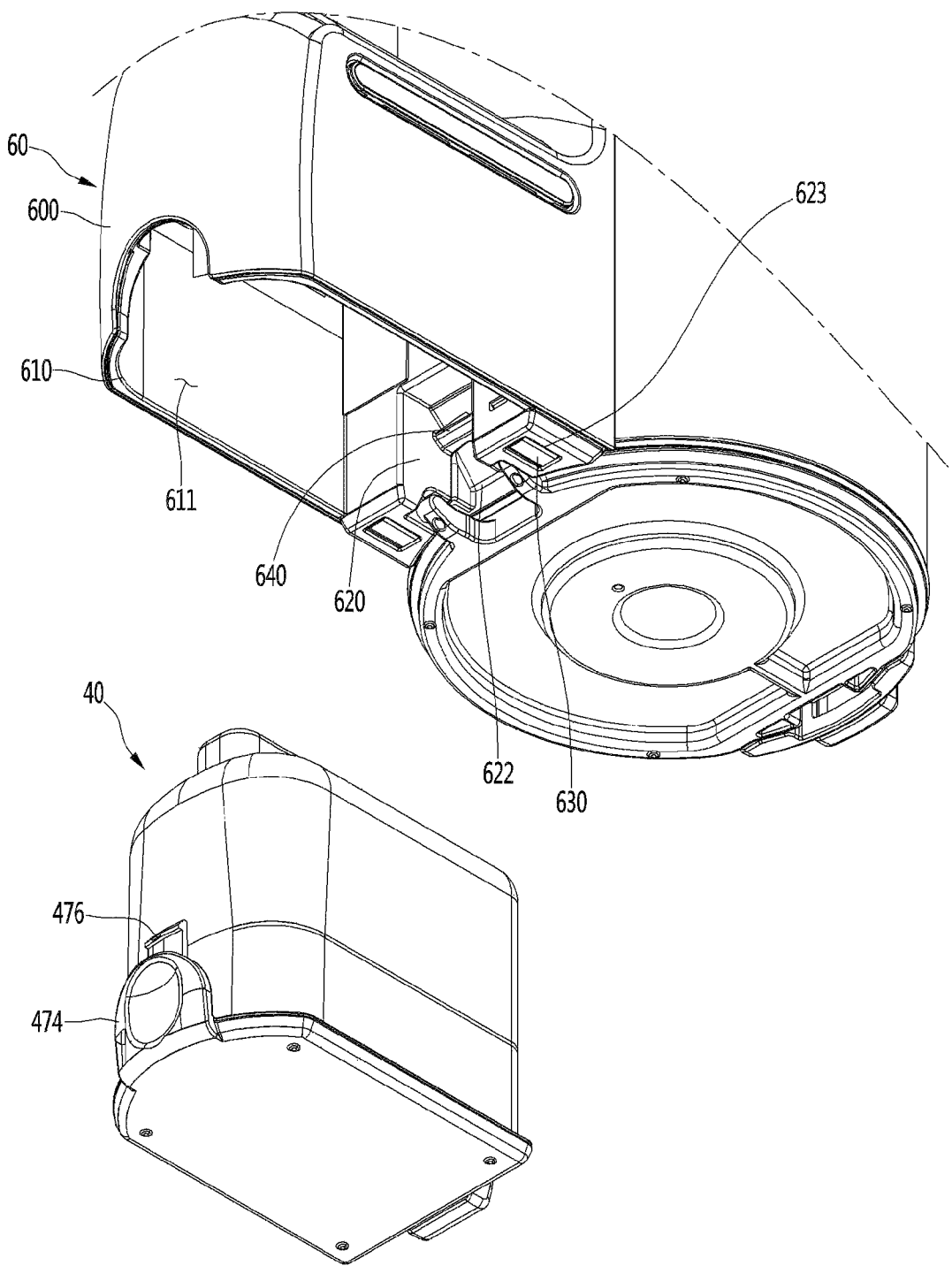
FIG. 6 is a view when a battery according to an embodiment of the present invention has been separated from a battery housing.
Figure 7:
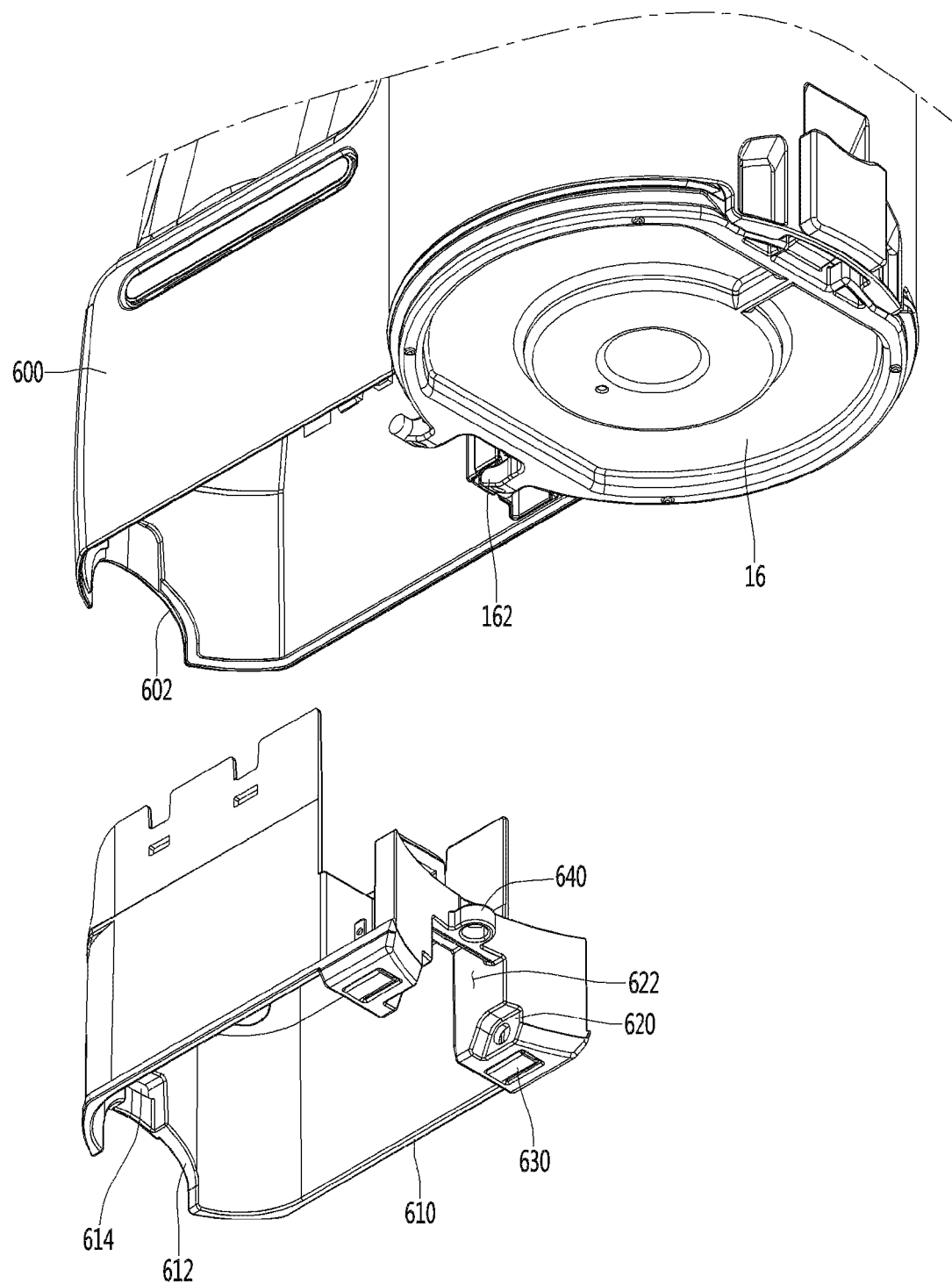
FIG. 7 is a view when an inner housing according to an embodiment of the present invention has been separated from the battery housing.
Figure 8:
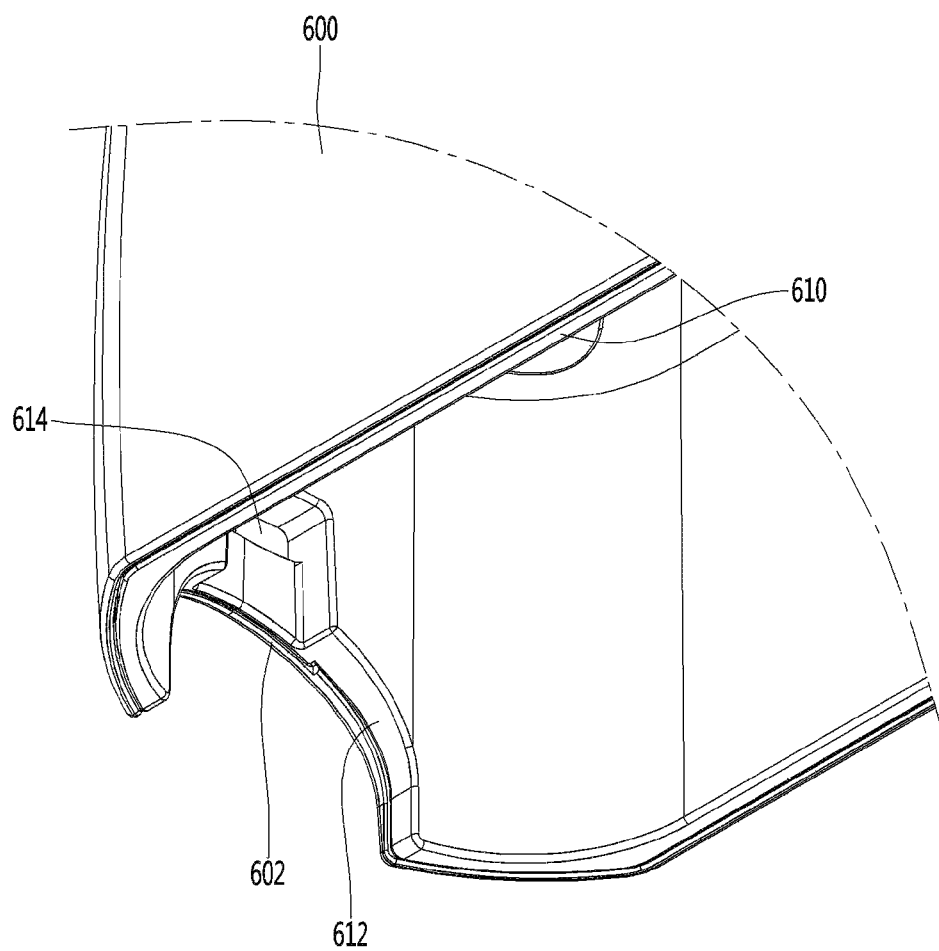
FIG. 8 is a view after the inner housing shown in FIG. 7 is coupled to the battery housing.

FIG. 6 is a view when a battery according to an embodiment of the present invention has been separated from a battery housing, FIG. 7 is a view when an inner housing according to an embodiment of the present invention has been separated from the battery housing, and FIG. 8 is a view after the inner housing shown in FIG. 7 is coupled to the battery housing.

Figure 9:
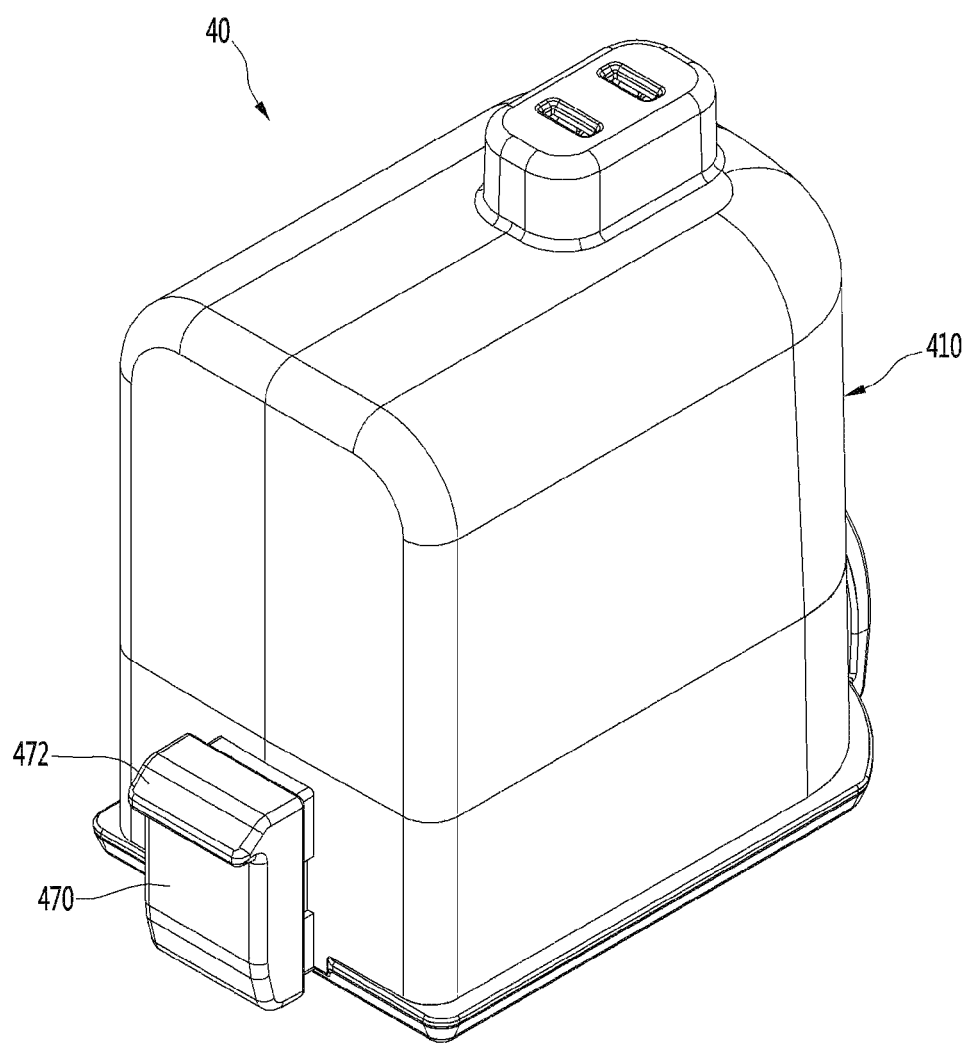
FIG. 9 is a perspective view of the battery according to an embodiment of the present invention.
Figure 10:
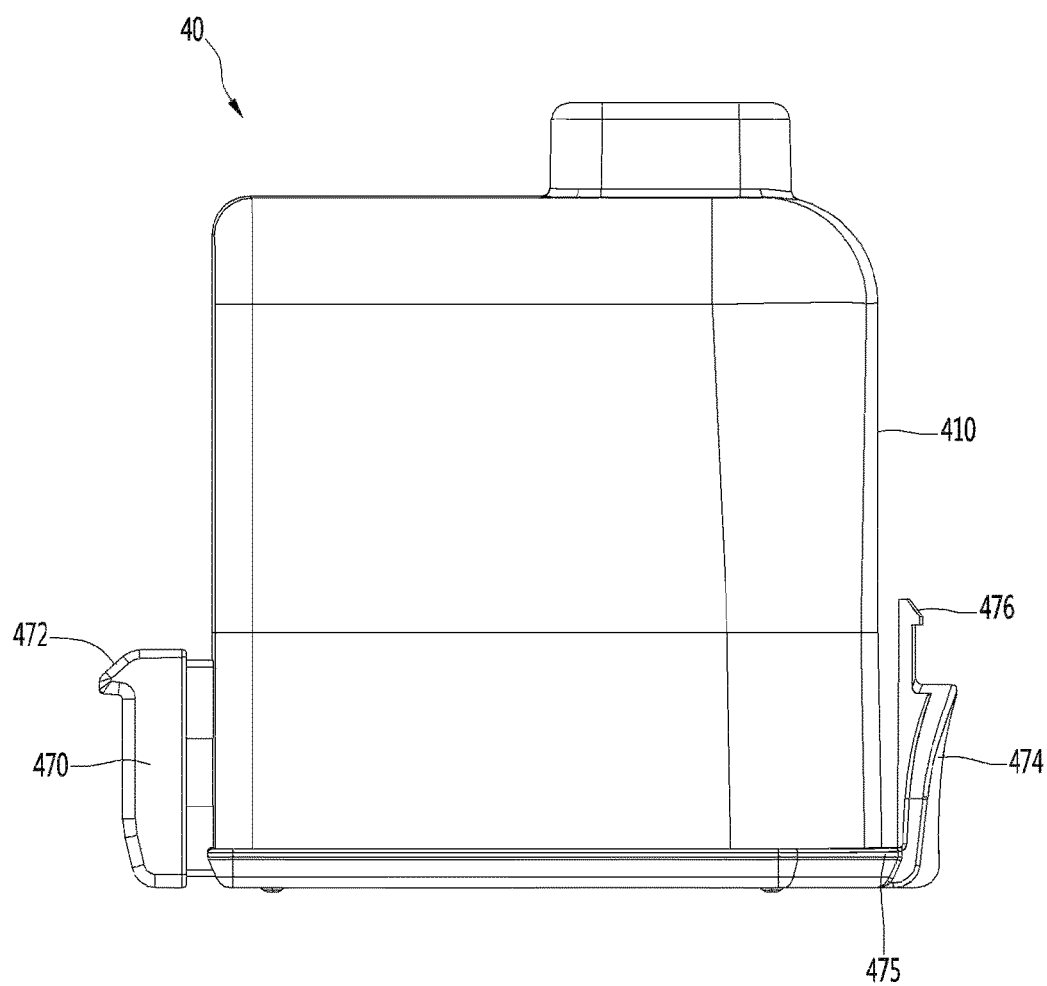
FIG. 10 is a front view of the battery shown in FIG. 9.

FIG. 9 is a perspective view of the battery according to an embodiment of the present invention and FIG. 10 is a front view of the battery shown in FIG. 9.

Referring to FIGS. 6 to 10, the battery housing 60 may include an outer housing 600 that is integrally formed with the handle 30 and an inner housing 610 that can be inserted in the outer housing 600.

The inner housing 610 may be inserted a lower side of the outer housing 600. The inner housing 610 provides a battery chamber 611 for receiving the battery 40.

The inner housing 610 may be fixed to one or more of the outer housing 600 and the first body 10. Further, the battery 40 may be coupled to the inner housing 610.

According to the present embodiment, the inner housing 610 is inserted into the outer housing 600 and then the battery 40 is inserted to be coupled to the inner housing 610, so it is possible to prevent the outer housing 600 from deforming or to prevent the outer housing 600 from being damaged when inserting or separating the battery 40.

Obviously, it may be possible to integrally form the inner housing 610 with the outer housing 600 without separately forming the inner housing 610.

The inner housing 610 may have a pair of hinge coupling portions 620 to which a hinge 162 of the body cover 16 is coupled. The hinge coupling portions 620 may be spaced at a predetermined distance from each other. Accordingly, a space 622 may be formed between the hinge coupling portions 620.

The inner housing 610 may further include a body fastening portion 642 to be fastened to the first body 10.

The inner housing 610 may further include first main body terminals 630 for charging the battery 40 coupled to the inner housing 610. It is possible to bring charging stand terminals in contact with the first main body terminals 630 by placing the cleaner 1 on a charging stand (not shown).

The first main body terminals 630 are disposed on the bottoms of the hinge coupling portions 620, but can be spaced apart from the floor when the cleaner 1 is placed on the floor. That is, terminal grooves 623 that are concave upward are formed on the bottoms of the hinge coupling portions 620 and the first main body terminals 630 can be disposed in the terminal grooves 623. Accordingly, damage to the first main body terminals 630 can be prevented.

Further, since the first main body terminals 630 are disposed in the terminal grooves 623, water cannot come in contact with the first main body terminals 630 when the cleaner 1 is placed on a floor.

The battery 40 may include a frame 410 that forms the external shape. The frame 410 and the battery chamber 611 may be formed in shapes corresponding to each other.

The battery 40 may further include a plurality of coupling portions 470 and 474. The coupling portions 470 and 474 may include a first coupling portion 470 disposed on a first side of the frame 410 and a second coupling portion 474 disposed on a second side of the frame 410. The first coupling portion 470 and the second coupling portion 474, for example, may be positioned opposite to each other.

The first coupling portion 470 may include a first hook 472. The first coupling portion 470 may be movably coupled to the outer side of the frame 410. The first coupling portion 470 can be elastically supported by an elastic member 473 (see FIG. 23) in the frame 410.

A locking rib 640 for locking the first hook 472 of the first coupling portion 470 may be formed between the hinge coupling portions 620.

While the battery 40 is coupled, the first hook 472 of the first coupling portion 470 can be locked to the locking rib 640 through the space 622.

The second coupling portion 474 is integrally formed with the frame 410 and can be elastically deformed by external force.

In detail, an extension 475 horizontally extends from the bottom of the frame 410 and the second coupling portion 474 extends upward from the end of the extension 475. The second coupling portion 474 is spaced from the outer side of the frame 410 by the extension 475.

That is, a space for deformation is defined between the frame 410 and the second coupling portion 474. The second coupling portion 474 can be elastically deformed toward the fame 410 by the space.

The second coupling portion 474 may include a second hook 476. The second hook 476 may be thinner than other portion of the second coupling portion 474.

The outer housing 600 has a first exposing hole 602 and the inner housing 610 has a second exposing hole 612 to expose the second coupling portion 474 to the outside so that the second coupling portion 474 can be operated with the battery 40 in the battery chamber 611.

Further, a coupling slot 614 for coupling the second hook 476 of the second coupling portion 474 may be formed over the second exposing hole 612 of the inner housing 610. The coupling slot 614 may be a hole or a groove.

The second hook 476 of the second coupling portion 474 can be inserted into the locking slot 614 when being inserted in the inner housing 610.

Figure 11:
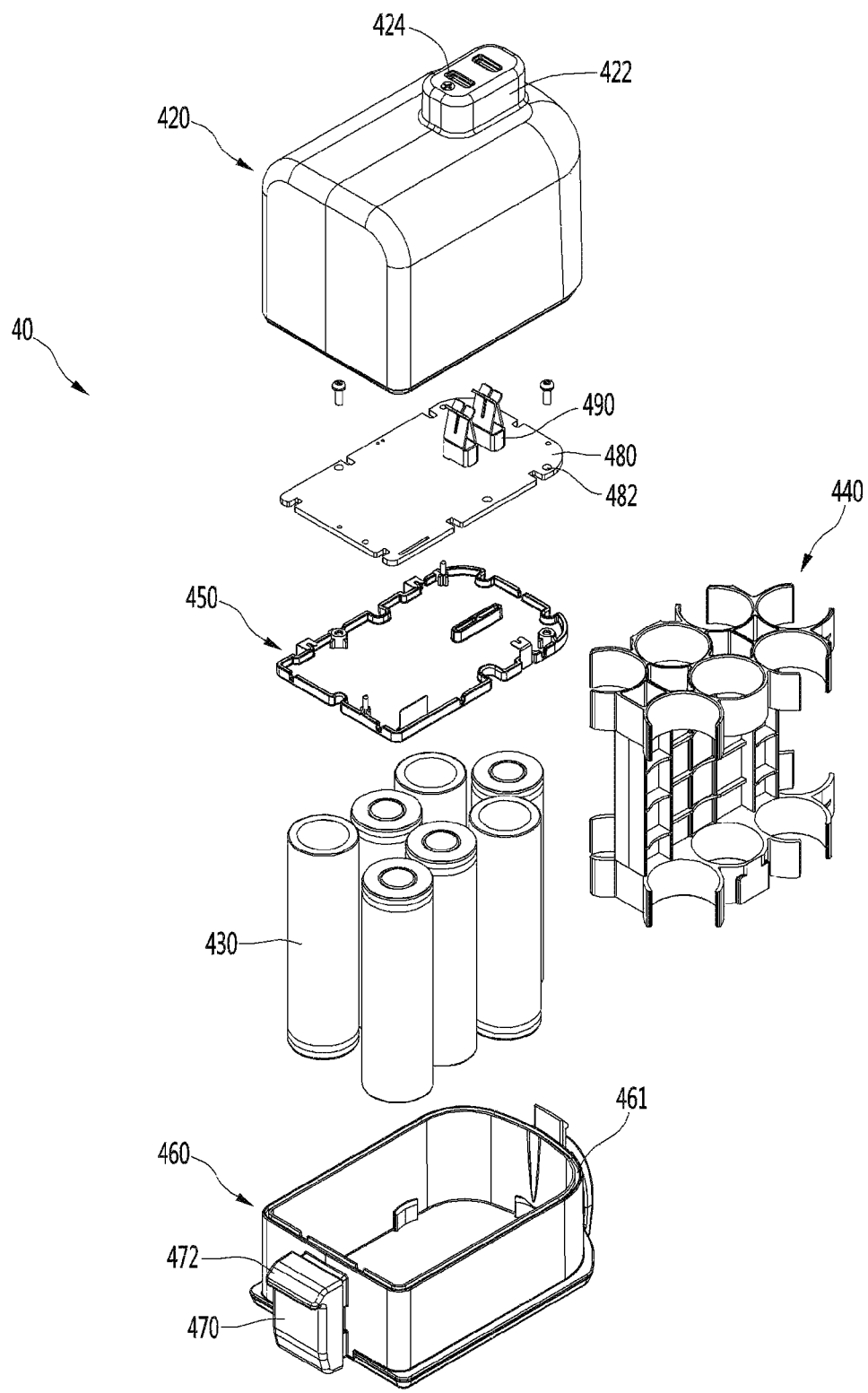
FIG. 11 is an exploded perspective view of the battery according to an embodiment of the present invention.

FIG. 11 is an exploded perspective view of the battery according to an embodiment of the present invention, FIG.

Figure 12:
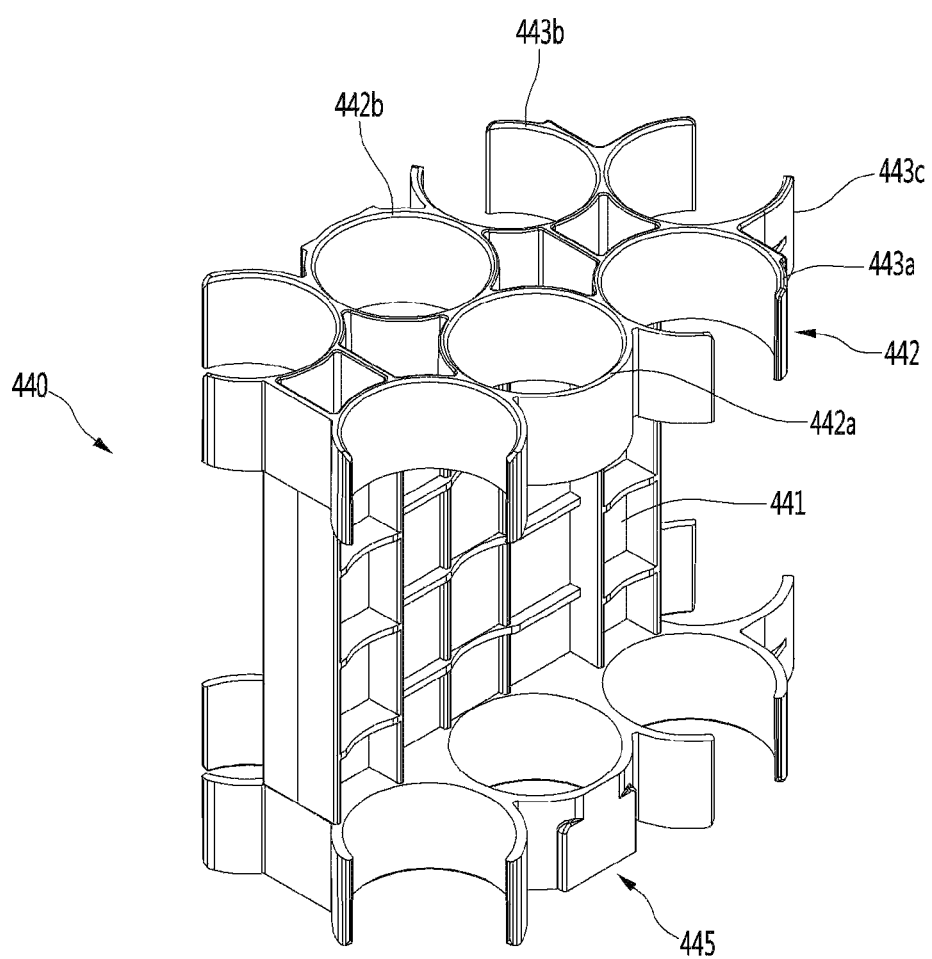
FIG. 12 is a perspective view showing a battery holder of the present invention.
Figure 13:
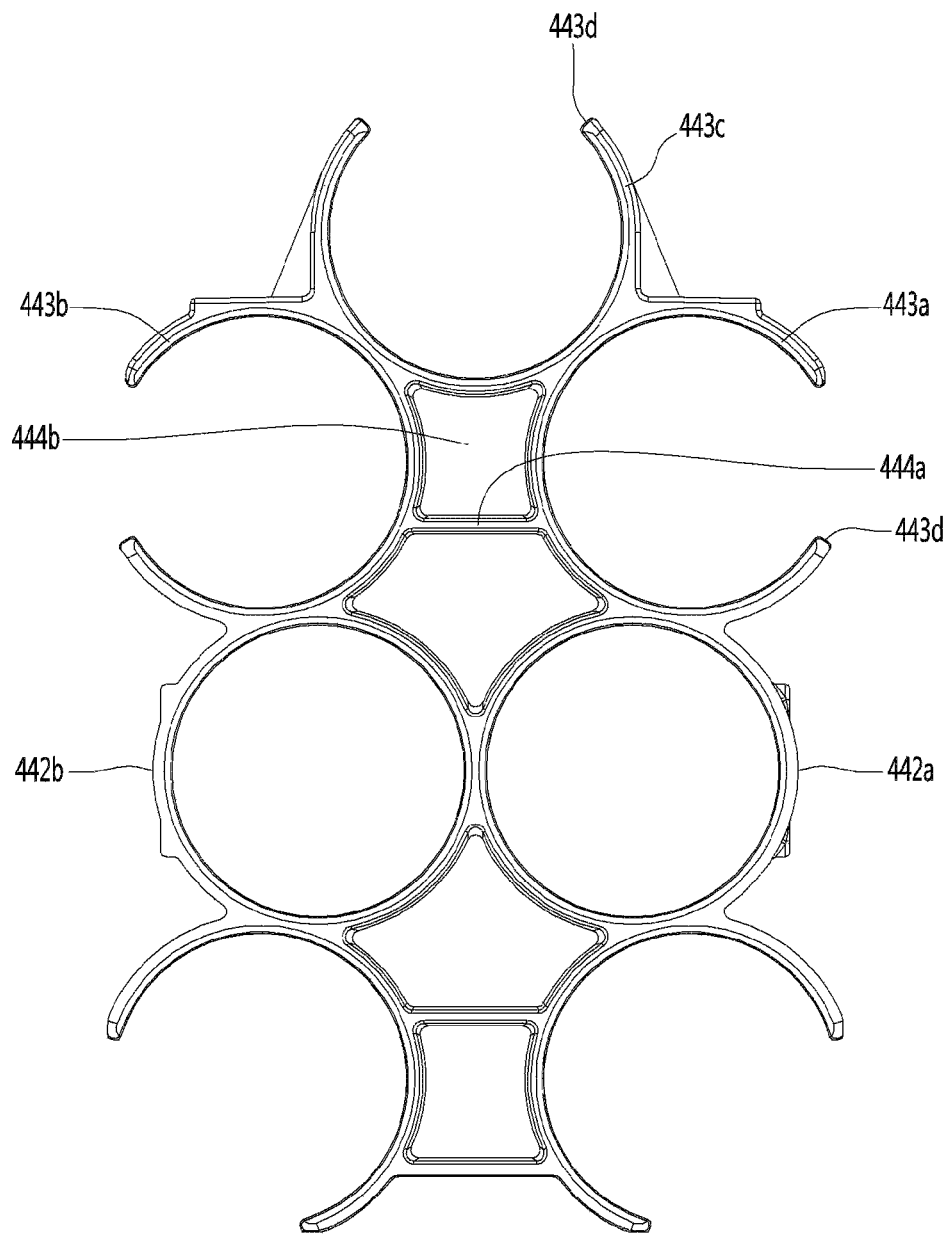
FIG. 13 is a plan view of the battery holder shown in FIG. 12.

12 is a perspective view showing a battery holder of the present invention, and FIG. 13 is a plan view of the battery holder shown in FIG. 12.

Referring to FIGS. 10 to 13, the battery 40 may further include a plurality of battery cells 430, a battery holder 440 supporting the battery cells 430, a battery management unit 480 managing the voltage of the battery cells 430, and battery terminals 490 connected to the battery management unit 480.

The battery cells 430, the battery holder 440, and the battery management unit 480 may be covered by the frame 410.

The battery 40 may further include a barrier 450 disposed between the battery cells 430 and the battery management unit 480.

The barrier 450 blocks heat transferring from the battery cells 430 to the battery management unit 480.

The frame 410 may include a first frame 420 and a second frame 460 coupled to the lower portion of the first frame 420.

A protrusion 422 is formed on the top of the first frame 420 and terminal holes 424 through which second main body terminals 670 (see FIG. 23) to be described below pass may be formed in the protrusion 422.

The terminal holes 424 are formed through the top of the protrusion 422. Accordingly, while the battery 40 is inserted upward into the battery hosing 60, the second main body terminals 670 (see FIG. 23) can be connected to the battery terminals 490 through the terminal holes 424.

The protrusion 422 may be positioned at a side from the center of the first frame 420 so that a user can easily recognize the direction in which the battery 40 is inserted into the battery housing 60. For example, the protrusion 422 may be positioned closer to the second coupling portion 474 between the first coupling portion 470 and the second coupling portion 474.

A seat 461 in which the lower end of the first frame 410 is seated may be formed at the top of the second frame 460.

The battery management unit 480 may be coupled to the top of the barrier 450. The battery management unit 480 may include one or more fastening holes 482 to be fastened to the barrier 450 by fasteners.

The battery holder 440 allows the battery cells 430 to be arranged in erected positions. For example, the longitudinal direction of the battery cells 430 may be in parallel with the directions in which the battery 40 is inserted into and separated from the battery housing 60.

The battery holder 440 allows the battery cells 430 to be arranged in a plurality of rows.

For example, the battery cells 430, though not limited, may include seven battery cells and the battery holder 440 may allow some of the seven battery cells to be arranged in two rows. However, it should be noted that the number of the battery cells 430 is not limited.

The battery holder 440 may have a separation wall 441 for dividing the battery cells 430 in two separate rows, first holders 442 formed at the upper portion of the separation wall 441, and second holders 445 formed at the lower portion of the separation wall 441.

The first holders 442 surround the upper portions of the battery cells 430 and the second holder 445 surround the lower portions of the battery cells 430.

The first holders 442 and the second holders 445 are vertically spaced from each other.

According to this configuration of the present embodiment, there is an advantage in that even if the battery cells 430 in any one of the two rows ignite, the battery cells 430 in the other row are prevented from being ignited by the separation wall 441.

Further, heat generated by the battery cells 430 in the two rows can be prevented from influencing each other in other rows by the separation wall 441.

The structure and shape of the second holders 445 are the same as those of the first holders 442, so hereafter, only the first holders 442 are described in detail and the description of the first holders 442 is referred to for the structure and shape of the second holders 445.

The first holders 442 may include cell cases 442a, 442b, 443a, 443b, and 443c that surround the upper portions of the battery cells 430.

The battery cells 430 are spaced from each other with the upper portions surrounded by the cell cases 442a, 442b, 443a, 443b, and 443c.

The cell cases 442a, 442b, 443a, 443b, and 443c may include first cell cases 442a and 442b that surround the entire outer sides of some of the battery cells 430, second cell cases 443a and 443b that partially surround the outer sides of some of the battery cells 430, and a third cell case 443c disposed between the two cell cases 443a and 443b.

For example, the first cell cases 442a and 442b may be formed in a cylindrical shape, and the second cell cases 443a and 443b and the third cell case 443c may be formed in a C-shape having an opening 443d.

In detail, two first cell cases 442a and 442b are in contact with each other, in which any one first cell case 442a surrounds a battery cell 430 in the first row and the other first cell case 442b surround a battery cell 430 in the second row.

Further, two second cell cases 443a and 443b may be horizontally spaced from each other with the separation wall 441 there between and may be connected to connectors 444a and 444b.

The connectors 444a and 444b may include a first connector 444a vertically connecting the two second cell cases 443a and 443b and a second connector 444b horizontally extending and connecting the two second cell cases 443a and 443b. The second connector 444b may be in contact with the upper portion of the separation wall 441.

By the connectors 444a and 444b, not only two spaced second cell cases 443a and 443b are connected, but the strength is improved.

The distance between the centers of the two second cell cases 443a and 443b is longer than the distance between the centers of the two first cell cases 442a and 442b.

The first cell cases 442a and 442b may be disposed between two groups of second cell cases 443a and 443b.

That is, a second cell case, a first cell case, and a second cell case may be sequentially arranged. According to this arrangement, the battery cells 430 can be arranged in a zigzag pattern in each row, so the horizontal length of the battery 40 can be reduced.

Since the battery cells 430 are arranged in a zigzag pattern, even if the number of the battery cells 430 is increased, the size of the battery 40 is not increased not that much, so the maximum chargeable voltage of the battery 40 can be increased.

Further, even if two second cell case 443a and 443b are spaced from each other with the separation wall 441 there between, the two second cell cases 443a and 443b, so the size of the first holder 442 can be reduced, thus the size of the frame 410 can be reduced.

The third cell case 443c is disposed between two spaced second cell cases 443a and 443b. Therefore, according to the present invention, the horizontal length of the battery 40 can be reduced.

Figure 14:
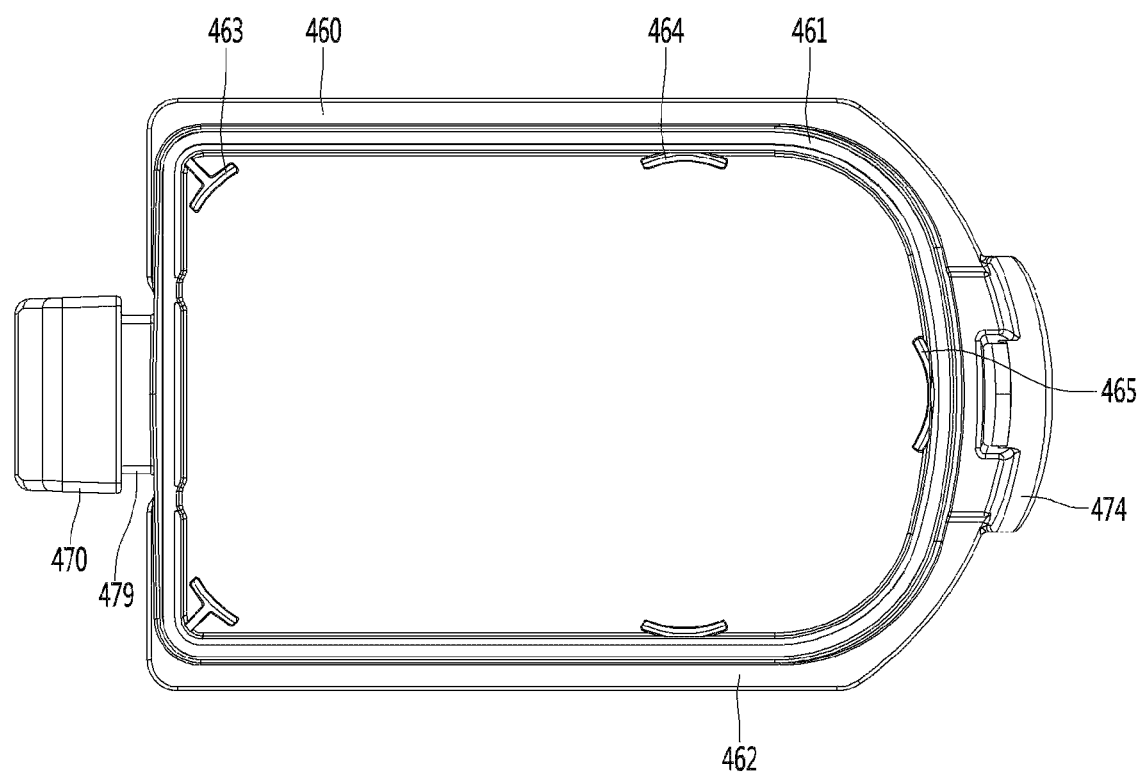
FIG. 14 is a plan view of a second frame according to an embodiment of the present invention.
Figure 15:
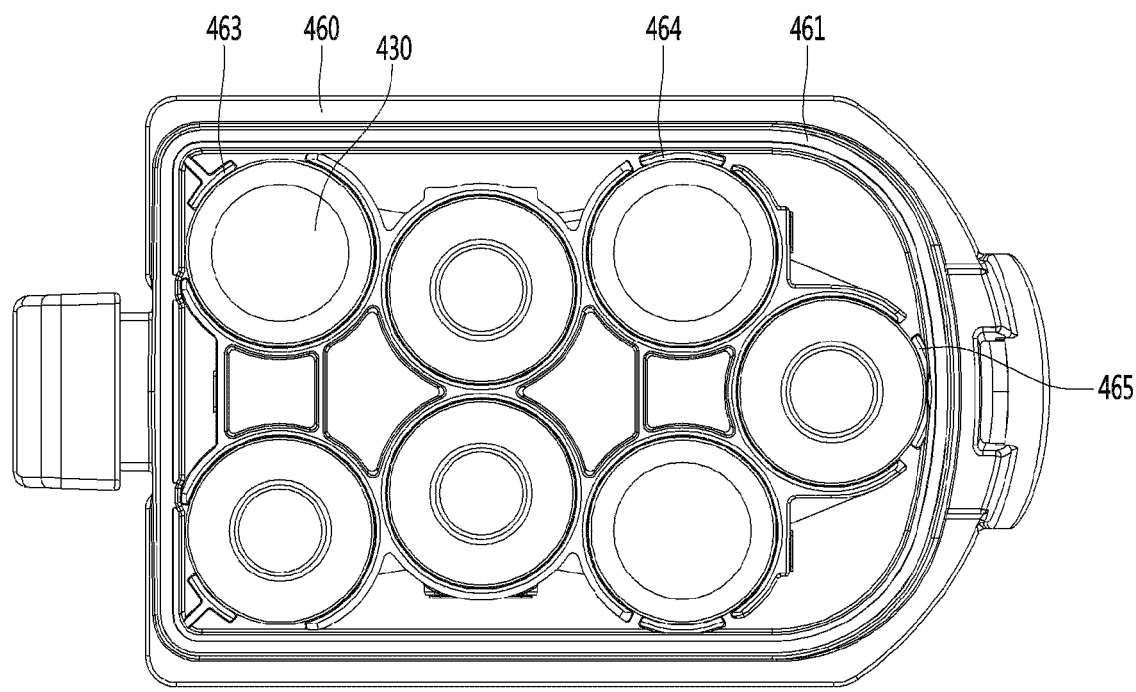
FIG. 15 is a plan view after a battery holder and battery cells are seated inside the second frame.

FIG. 14 is a plan view of a second frame according to an embodiment of the present invention and FIG. 15 is a plan view after the battery holder and the battery cells are seated inside the second frame.

Referring to FIGS. 14 and 15, the second frame 460 may have a support flange 462 for supporting the lower ends of the inner housing 610 and the outer housing 600 with the battery 40 inserted in the battery housing 60.

The support flange 462 may horizontally extend outward from the bottom of the second frame 460.

A coupling body 479 for coupling the first coupling portion 470 is formed on one side around the second frame 460 and the second coupling portion 474 is formed on another side around the second frame 460.

The second frame 460 may further include contact ribs 463, 464, and 465 being in contact with the battery cells 430 retained in the battery holder 440.

The contact ribs 463, 464, and 465 prevent horizontal movement of the battery cells 430 in the frame 410 in contact with the battery cells 430.

The contact ribs 463, 464, and 465 may include first contact ribs 463 disposed at corners of the second frame 460, second contact ribs 464 being in contact with the battery cells 430 in the second cell cases 443a and 443b disposed between the first cell cases 442a and 442b and the third cell case 443c, and a third contact rib 465 being in contact with the battery cell 430 in the third cell case 443c.

As described above, since the second cell cases 443a and 443b and the third cell case 443c have the openings 443d, when the battery cells 430 are fitted in the second cell cases 443a and 443b and the third cell case 443c, the battery cells 430 are partially exposed to the outside, and accordingly, the contact ribs 463, 464, and 465 can come in contact with the battery cells 430.

The contact ribs 463, 464, and 465 may be rounded with a curvature corresponding to the curvature of the outer sides of the battery cells 430 to stably in contact with the battery cells 430.

When the battery holder 440 is disposed inside the second frame 460, a portion of the battery holder 440 may be spaced apart from the second frame 460. Accordingly, the space between the battery holder 440 and the second frame 460 functions as a heat dissipation space for heat from the battery cells 430 to be naturally dissipated.

Figure 16:
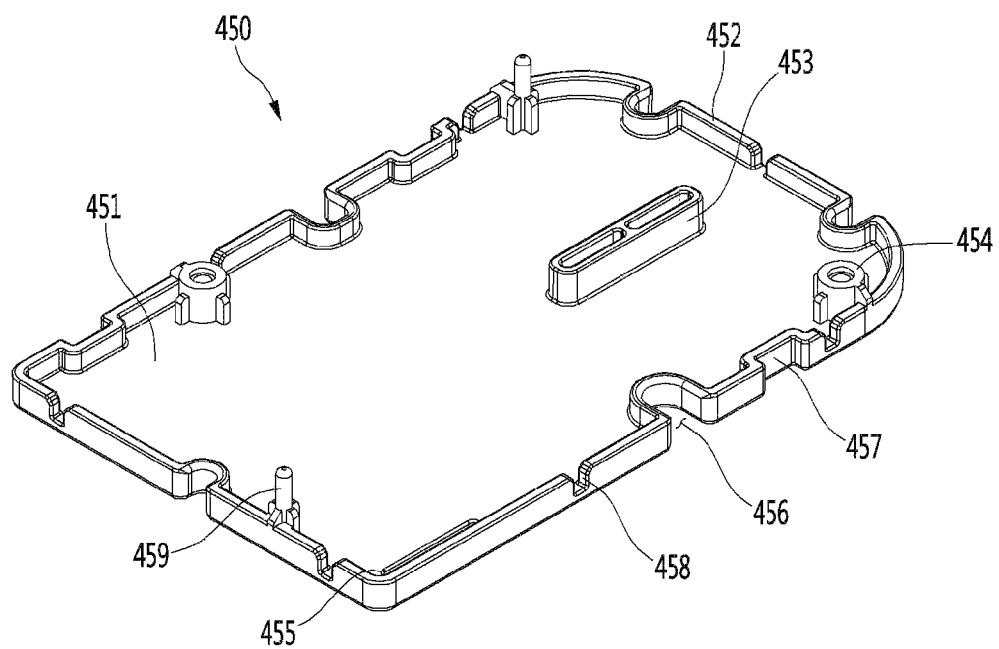
FIG. 16 is a perspective view of a barrier according to an embodiment of the present invention.
Figure 17:
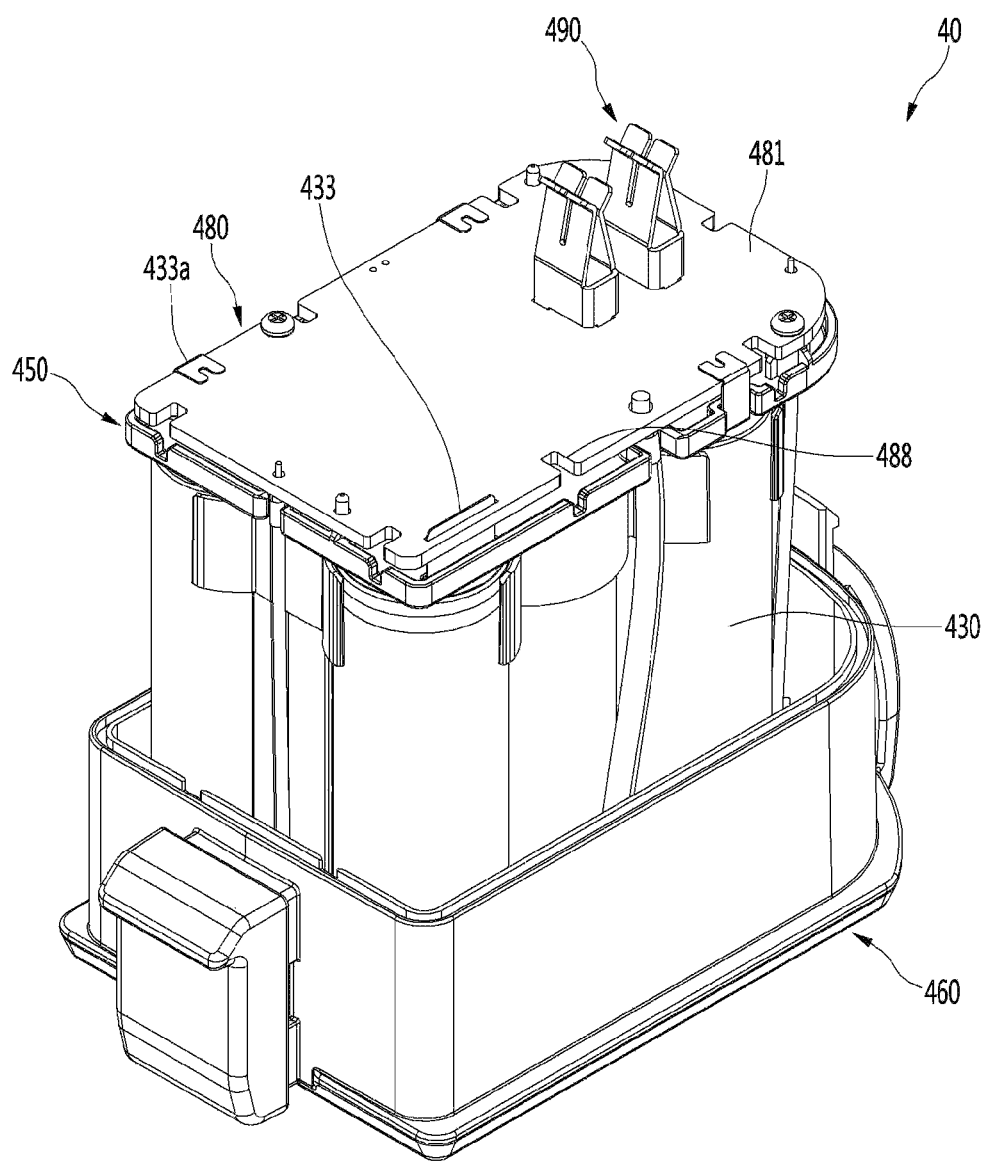
FIG. 17 is a perspective view showing the battery shown in FIG. 9 with a first frame removed.
Figure 18:
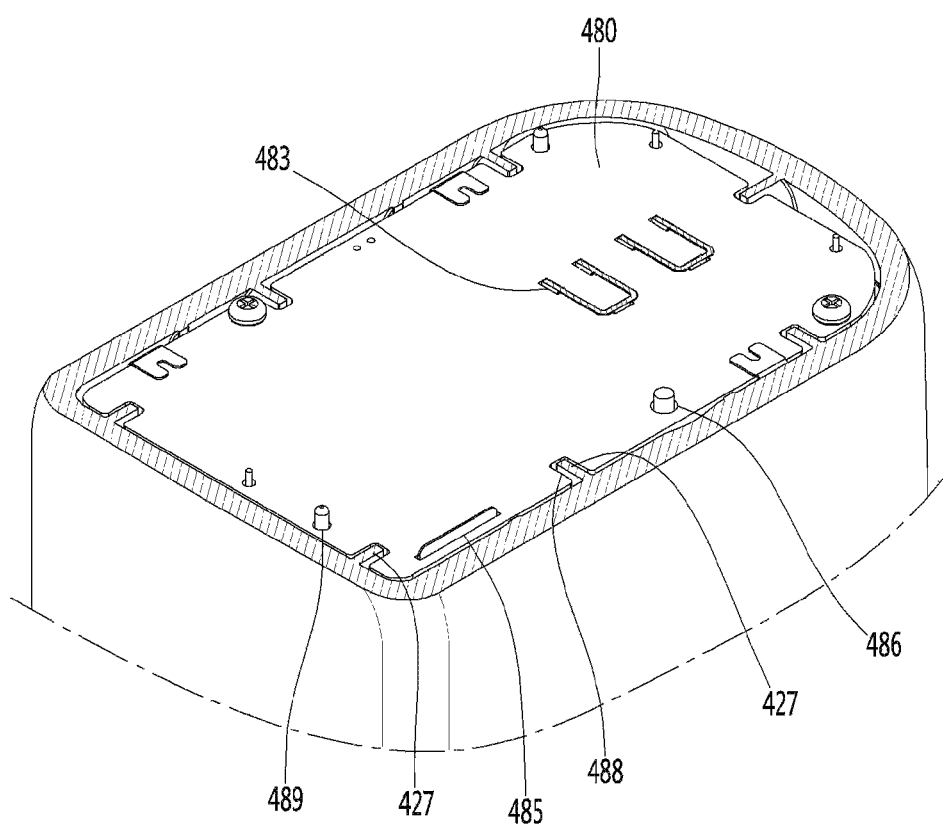
FIG. 18 is a horizontal cross-sectional view of the battery which shows the arrangement relationship between movement prevention ribs of the first frame and a battery management unit.
Figure 19:
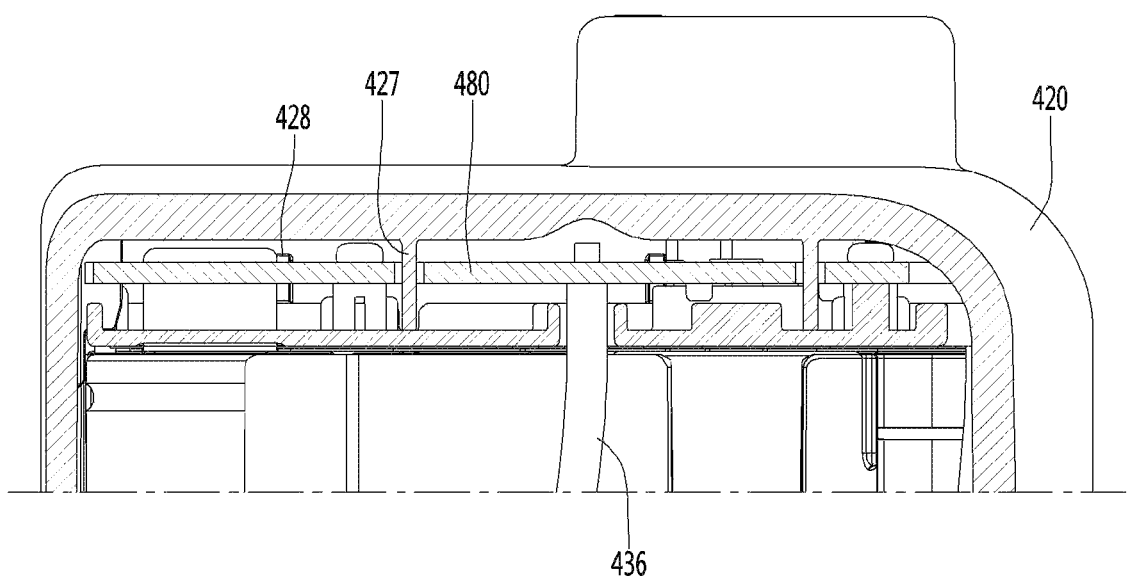
FIG. 19 is a vertical cross-sectional view of the battery which shows the arrangement relationship between the movement prevention ribs of the first frame and the battery management unit.

FIG. 16 is a perspective view of the barrier according to an embodiment of the present invention, FIG. 17 is a perspective view showing the battery shown in FIG. 9 with a first frame removed, FIG. 18 is a horizontal cross-sectional view of the battery which shows the arrangement relationship between movement prevention ribs of the first frame and a battery management unit, and FIG. 19 is a vertical cross-sectional view of the battery which shows the arrangement relationship between the movement prevention ribs of the first frame and the battery management unit.

Referring to FIGS. 16 to 19, the barrier 450 may include a flat plate 451.

The plate 451 is disposed over the battery cells 430 to block heat transferring from the battery cells 430 to the battery management unit 480.

The barrier 450 may further include an outer rib 452 protruding upward along the edge of the plate 451. The outer rib 452 increases the strength of the barrier 450.

The battery management unit 480 may include a circuit board 481 and the battery terminals 490 may be directly formed on the circuit board 481. Pin holes 483 through which terminal connection pins to be described below pass may be formed at the battery management unit 480.

The circuit board 481 may be coupled to the barrier 450 over the plate 451. The circuit board 481 and the plate 451 are arranged in parallel and spaced from each other.

The longitudinal direction of the battery cell 430 may cross the circuit board 481 and the plate 451.

While the battery 40 is inserted into the battery housing 60, the second main body terminals 670 (see FIG. 23) are coupled to the battery terminals 490. When the second main body terminals 670 (see FIG. 23) are coupled to the battery terminals 490, a downward force may be applied to the battery terminals 490. The pressure applied to the battery terminals 490 may be transmitted to the circuit board 481 and the circuit board 481 is spaced apart from the plate 451, so when the circuit board 481 is pressed down, the circuit board 481 can be deformed, and in this case, the circuit board 481 may be broken.

In the present embodiment, the barrier 450 may further include an anti-deformation rib 453 extending upward from the plate 451 and preventing deformation of the battery management unit 480 in order to prevent breakage of the circuit board 481.

When the circuit board 481 is combined with the barrier 450, the anti-deformation rib 453 may be in contact with the circuit board 481, adjacent to the pin holes 483 of the circuit board 481.

Alternatively, the anti-deformation rib 453 may be disposed close to the circuit board 481, and it may be brought in contact with the bottom of the circuit board 481 when the circuit board 481 is pressed down.

The barrier 450 may further include one or more fastening bosses 454 to be fastened to the circuit board 481 by fasteners. The fastening bosses 454 may extend upward on the plate 451.

The fastening bosses 454 may be positioned inside the outer rib 452 and may be formed integrally with the outer rib 452.

The fastening bosses 454 protrude higher than the outer rib 452 from the plate 451 so that the outer rib 452 and the circuit board 481 can be spaced from each other when the barrier 450 and the circuit board 481 are fastened.

The plate 451 may include a guide hole 455 through which a first top conductive plate 433 passes and guide grooves 457 for guiding second top conductive plates 433a. The guide hole and grooves 455 and 457 guide the top conductive plates 433 and 433a to the circuit board 481, so they may be referred to as, in combination, a first guide.

The circuit board 481 may also include a guide hole 485 (or it may be referred to as a second guide) through which the first conductive plate 433 passes.

Though not shown in the figures, the anodes (+) and the cathodes (−) of two adjacent battery cells of the battery cells 430 may be connected through a conductor. The conductive plates 433 and 433a may be connected to the conductor connecting the two battery cells 430.

For example, since seven battery cells are provided in the present invention, three conductors may connect the anodes (+) and the cathodes (−) of two battery cells and one conductor may be connected to one electrode (anode (+) or cathode (−)) of one battery cell, over the battery cells.

The first top conductive plate 433 may be connected to the top of the circuit board 481 through the guide holes 485 of the plate 451 and the circuit board 481.

The second top conductive plates 433a may be guided upward along the guide grooves 457 and then bent horizontally, whereby they can be connected to the top of the circuit board 481.

Since the conductive plates 433 and 433a are connected to the circuit board 481, the battery management unit 480 can manage the voltage of the battery cells 430.

The plate 451 may include guide projections 459 for guiding the circuit board 481 when it is combined with the circuit board 481. The guide projection 459 may protrude upward from the plate 451. The guide projections 459 may protrude higher than the outer rib 452 to be able to pass through the circuit board 481.

Projection holes 489 through which the guide projections 459 pass may be formed at the circuit board 481.

On the other hand, the first frame 420 may include a plurality of movement prevention ribs for preventing moment of the barrier and the battery management unit 480 inside the first frame 420.

The movement prevention ribs may protrude from the inner side of the first frame 420. The movement prevention ribs may include a first movement prevention rib 427 and a second movement prevention rib 428.

The circuit board 481 may include a rib slot 488 through which the first movement prevention rib 427 passes and the barrier 450 may include a rib receiving groove 458 in which the first movement prevention rib 427 passing through the rib slot 488 is seated.

When the first movement prevention rib 427 is seated in the rib receiving groove 458, the first movement prevention rib 427 may be seated on the plate 451. The second movement prevention rib 428 may be seated on the outer rib 452.

When the first movement prevention rib 427 is seated in the rib receiving groove 458 through the rib slot 488 and the second movement prevention rib 428 is seated on the outer rib 452, not only horizontal movement, but upward movement of the barrier 450 and the battery management unit 480 are restricted.

Figure 20:
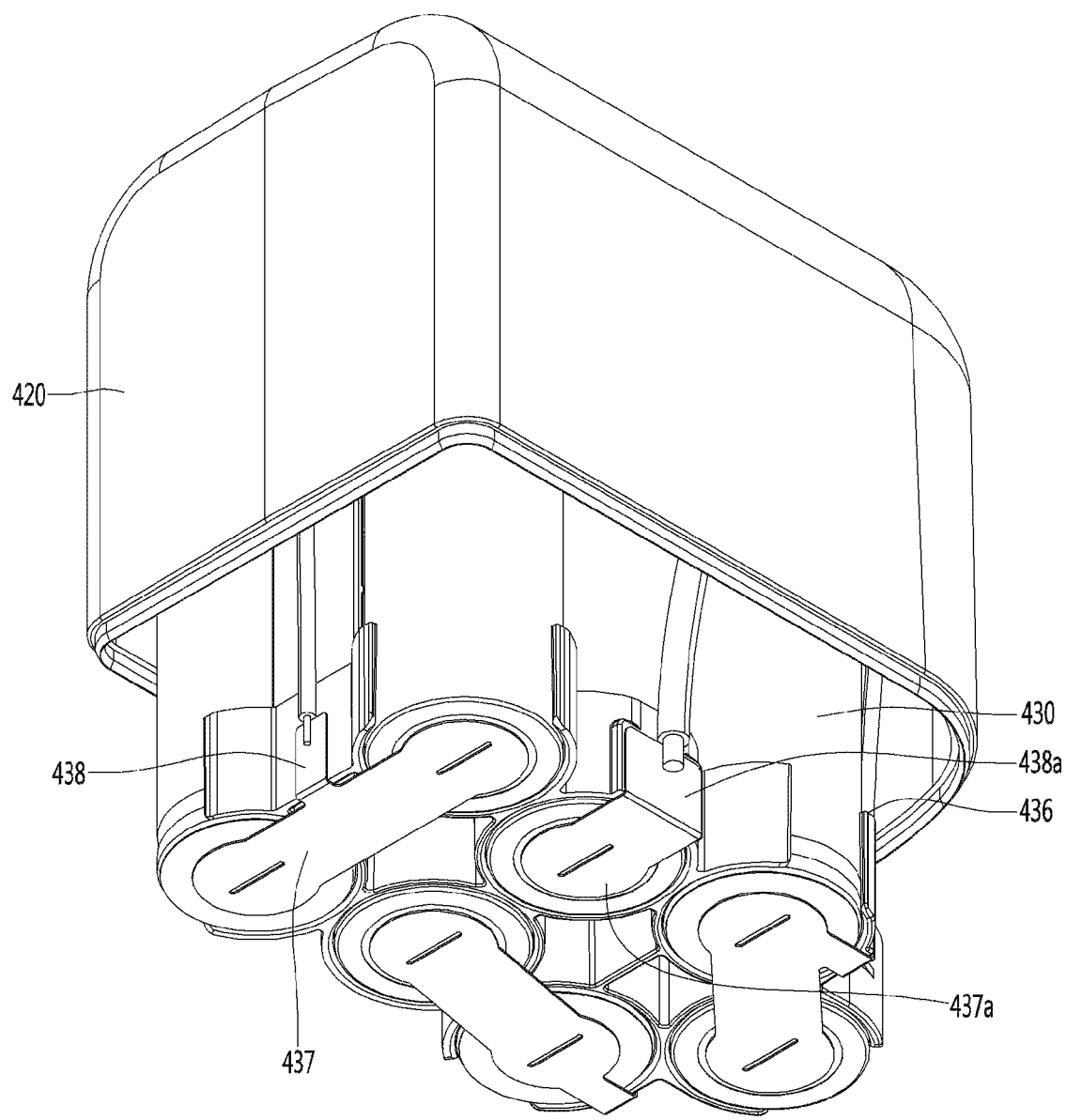
FIG. 20 is a view showing the battery shown in FIG. 9 with a second frame removed.

FIG. 20 is a view showing the battery shown in FIG. 9 with the second frame removed.

Referring to FIGS. 16, 19 and 20, a plurality of first bottom conductors 437 may connect the anodes (+) and the cathodes (−) of two battery cells 430 under the battery cells 430.

For example, since seven battery cells are provided in the present invention, three first bottom conductors 437 may connect the anodes (+) and the cathodes (−) of two battery cells and one second bottom conductor 437a may be connected to one electrode (anode (+) or cathode (−)) of one battery cell, under the battery cells.

First bottom conductive plates 438 may be connected to the first bottom conductors 437. For example, the first bottom conductive plats 438 may be integrally formed with the first bottom conductors 437 and may be bent upward from the first bottom conductors 437.

Second bottom conductive plates 438a may be connected to the second bottom conductors 437a. For example, the second bottom conductive plats 438a may be integrally formed with the second bottom conductors 437a and may be bent upward from the second bottom conductors 437a.

Wires 436 may be connected to the bottom conducive plates 438 and 438a. The wires 436 may be connected to the circuit board 481.

The barrier 450 may include wire seats 456 in which the wires 436 are seated and the circuit board 481 may include wire holes 486 through which the wires 436 pass.

In the present invention, the wire grooves 456 may be referred to as first wire guides and the wire holes 486 may be referred to as second wire guide.

Figure 21:
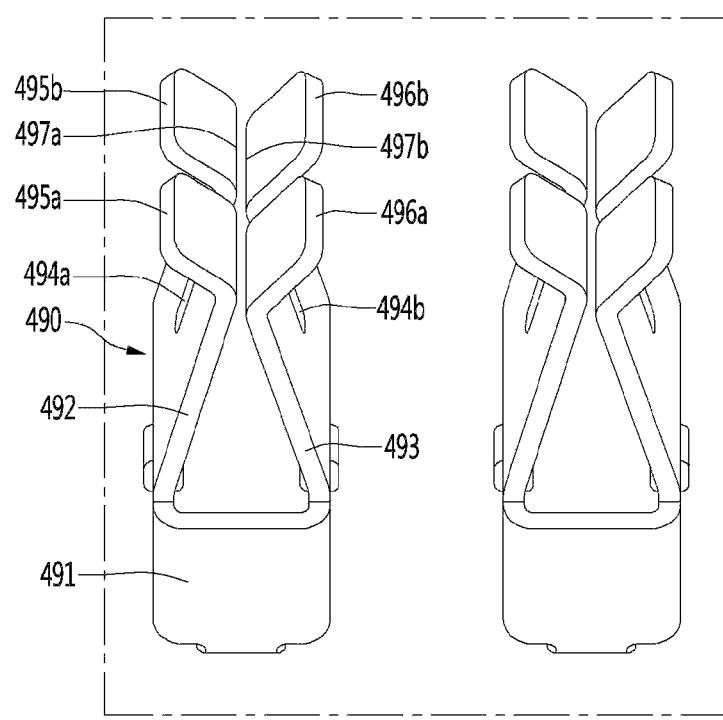
FIG. 21 is a perspective view showing battery terminals according to an embodiment of the present invention.
Figure 22:
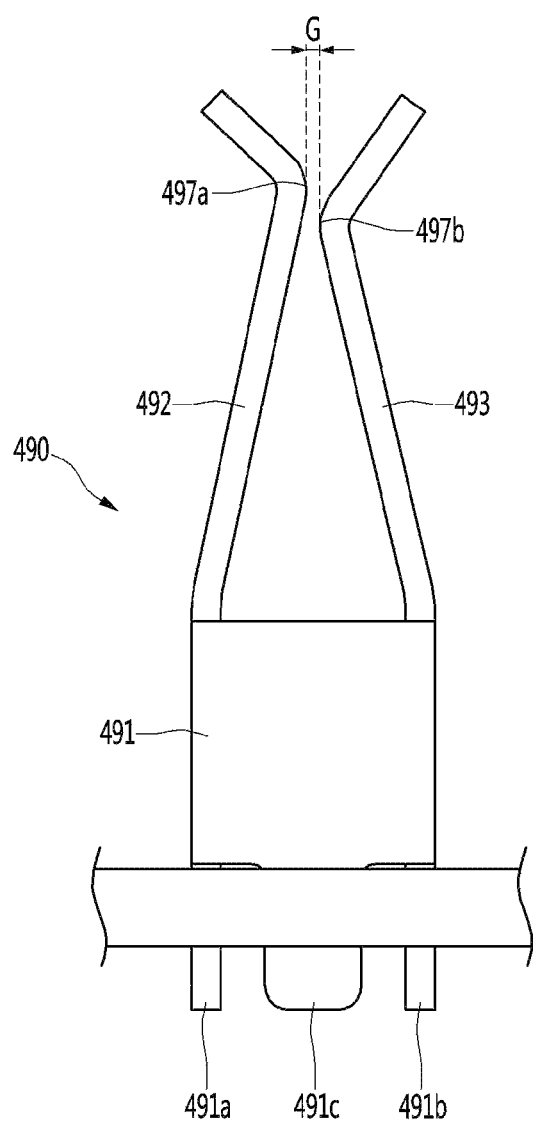
FIG. 22 is a front view of one of the battery terminals of the present invention.

FIG. 21 is a perspective view showing the battery terminals according to an embodiment of the present invention and FIG. 22 is a front view of a battery terminal of the present invention.

Referring to FIGS. 17, 21, and 22, a pair of battery terminals 490 may be directly disposed on the circuit board 481.

The battery terminals 490 may be erected on the circuit board 481. The battery terminals 490 may be partially or fully disposed in the protrusion 422 of the frame 410.

Accordingly, while the battery 40 is vertically inserted into the battery housing 60, the second main body terminals 670 (see FIG. 23) can be coupled to the battery terminals 490.

The battery terminals 490 each may have a base 491 to be installed on the circuit board 481.

The base 491 may include a plurality of installation pins 491a, 491b, and 491c passing through the pin holes 483 of the circuit board 481.

The installation pins 491a, 491b, and 491c may include a first pin 491a and a second pin 491b spaced from each other. The first pin 491a and the second pin 491b may be arranged to face each other.

The installation pins 491a, 491b, and 491c may include a third pin 491c disposed to cross the first pin 491a and the second pin 491b in an area corresponding to the area between the first pin 491a and the second pin 491b.

When the battery terminals 490 are installed on the circuit board 481 and the circuit board 481 is installed over the barrier 450, the anti-deformation rib 453 of the barrier 450 may be positioned in an area between a line connecting the first pin 491a and the second pin 491b, and the third pin 491c Accordingly, it is possible to effectively prevent deformation of the circuit board 481 when the battery terminals 490 and the second main body terminals 670 (see FIG. 23) are combined.

The battery terminals 490 each may have a pair of clip terminals 492 and 493 extending upward from the base 491.

The clip terminals 492 and 493 may include a first clip terminal 492 and a second clip terminal 493.

The first clip terminal 492 and the second clip terminal 493 can be elastically deformed on the base 491 and the second main body terminal 670 (see FIG. 23) are in contact with the first clip terminal 492 and the second clip terminal 493 between the first clip terminal 492 and the second clip terminal 493.

In order for the clip terminals 492 and 493 can be elastically deformed and the second main body terminal 670 (see FIG. 23) is positioned between the clip terminals 492 and 493, the clip terminals 492 and 493 may extend toward each other, as they go upward, and then extend away from each other at a predetermined height.

Accordingly, as the extension directions of the clip terminals 492 and 493 are changed, the clip terminals 492 and 493 may have contact portions 497a and 497b, respectively. That is, the first clip terminal 492 may have a first contact portion 497a and the second clip terminal 493 may have a second contact portion 497b.

In order to improve contact reliability between the contact portions 497a and 497b of the clip terminals 492 and 493 and the second main body terminal 670 (see FIG. 23), a cut portion 494a and 494b for dividing the clip terminals 492 and 493 into a plurality of independent terminals, respectively, may be formed at the clip terminals 492 and 493.

When the cut portions 494a and 494b are formed at the clip terminals 492 and 493 in the present invention, the number of independent terminals of the clip terminals 492 and 493 is increased, so the reliability in contact with the second main body terminal 670 (see FIG. 23) is improved, but the contact area with the second main body terminal 670 (see FIG. 23) is decreased, so a short circuit may occur when a current is high.

Accordingly, the clip terminals 492 and 493 each have two independent terminals 495a, 495b, 496a, and 496b horizontally spaced from each other by the cut portions 494a and 494b, respectively.

The first clip terminal 492 includes a first independent terminal 495a and a second independent terminal 495b and the second clip terminal 403 includes a third independent terminal 496a and a fourth independent terminal 496b.

The independent terminals 495a, 495b, 496a, and 496b have contact portions 497a and 497b, respectively. Accordingly, the clip terminals each have two contact portions 497a and 497b in the present invention.

Figure 23:
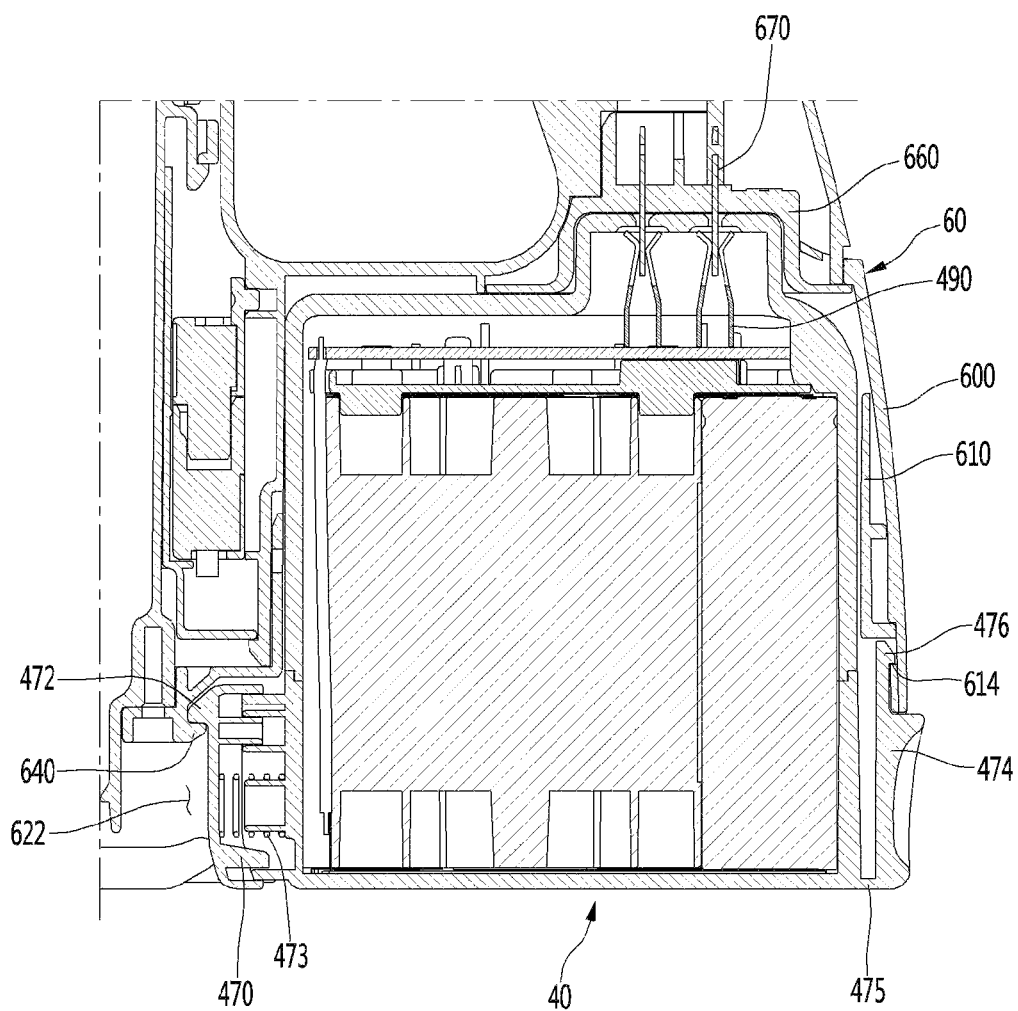
FIG. 23 is a cross-sectional view showing the battery inserted in the battery housing.

In order to improve contact reliability between the contact portions 497a and 497b of the clip terminals 492 and 493 and the second main body terminal 670 (see FIG. 23), the first contact portion 497a of the first clip terminal 492 and the second contact portion 497b of the second clip terminal 493 may be spaced from each other in parallel with the coupling direction of the second main body terminal 670 (see FIG. 23).

That is, the first contact portion 497a and the second contact portion 497b may be arranged not to face each other.

In the present invention, for example, the first contact portion 497a and the second contact portion 497b may be vertically spaced from each other.

The horizontal gap between the first contact portion 497a and the second contact portion 497b is smaller than the thickness of the second main body terminal 670 (see FIG. 23) and the gap may not be provided.

Alternatively, the first contact portion 497a and the second contact portion 497b may be arranged to vertically overlap each other.

According to the present invention, even if the battery 40 is frequently inserted in the battery housing 60 and thus the first clip terminal 492 and the second clip terminal 493 are deformed away from each other, whereby the restoring force is reduced, the gap between the first contact portion 497a and the second contact portion 497b can be kept smaller than the thickness of the second main body terminal 670 (see FIG. 23), so the contact reliability can be improved.

Figure 24:
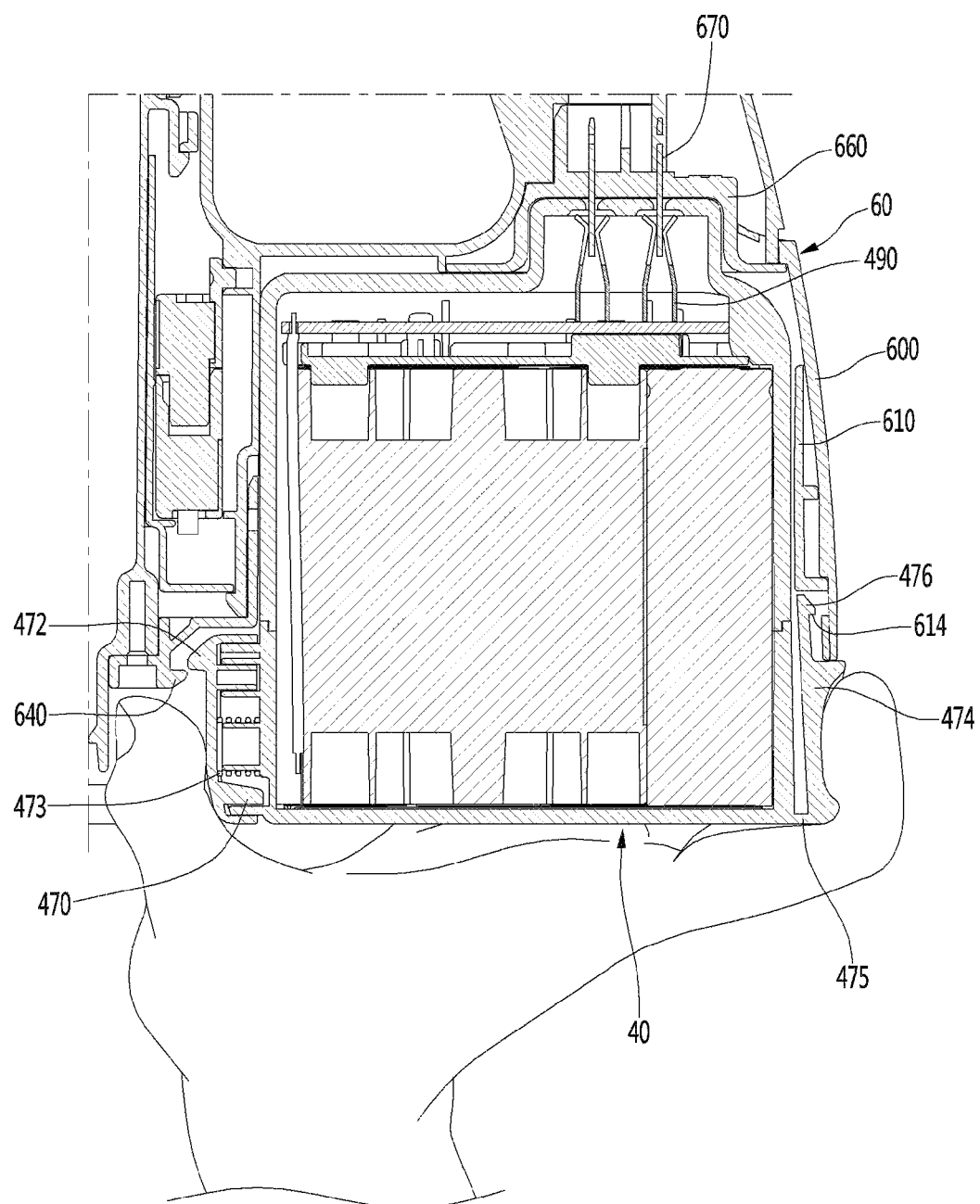
FIG. 24 is a view when a user has operated a first coupling portion and a second coupling portion to separate the battery from the battery housing.

FIG. 23 is a cross-sectional view showing the battery inserted in the battery housing and FIG. 24 is a view when a user has operated a first coupling portion and a second coupling portion to separate the battery from the battery housing.

Referring to FIGS. 23 and 24, the battery housing 60 may have the receiving portion 660 for receiving the protrusion 422. The receiving portion 660 may have second main body terminals 670 for coupling to the battery terminals 490.

In this embodiment, since the second main body terminals 660 are inserted through the terminal holes 424 when the protrusion 422 is inserted into the receiving portion 670, the receiving portion 670 guides the protrusion 422 moving upward so that the second main body terminals 670 can be stably inserted through the terminal holes 424.

In order to separate the battery from the battery housing 60, a user can insert fingers into the space 622 defined between the hinge coupling portions 620.

Further, the user can press the first coupling portion 470 toward the frame 410 with the finger. Accordingly, the elastic member 473 contracts and the first hook 472 of the first coupling portion 470 is unlocked from the locking rib 640.

Further, the user can unlock the second coupling portion 474 from the battery housing 60 by operating the second coupling portion 474 exposed to the outside of the battery housing 60.

In detail, the user presses the second coupling portion 474 toward the frame 410. Accordingly, the second coupling portion 474 is bent toward the frame 410 by the space between the frame 410 and the second coupling portion 474. Therefore, the second hook 476 is pulled out of the coupling slot 614.

As a result, the first coupling portion 470 and the second coupling portion 474 are moved toward each other by a user, whereby they are unlocked.

Accordingly, a user can unlock the first coupling portion 470 and the second coupling portion 474 using two fingers, so the user can easily separate the battery 40 downward from the battery housing 60.

According to the present invention, since the battery 40 can be separated from the battery housing 60, it is possible to place only the battery 40 on the cradle to charge it.

Figure 25:
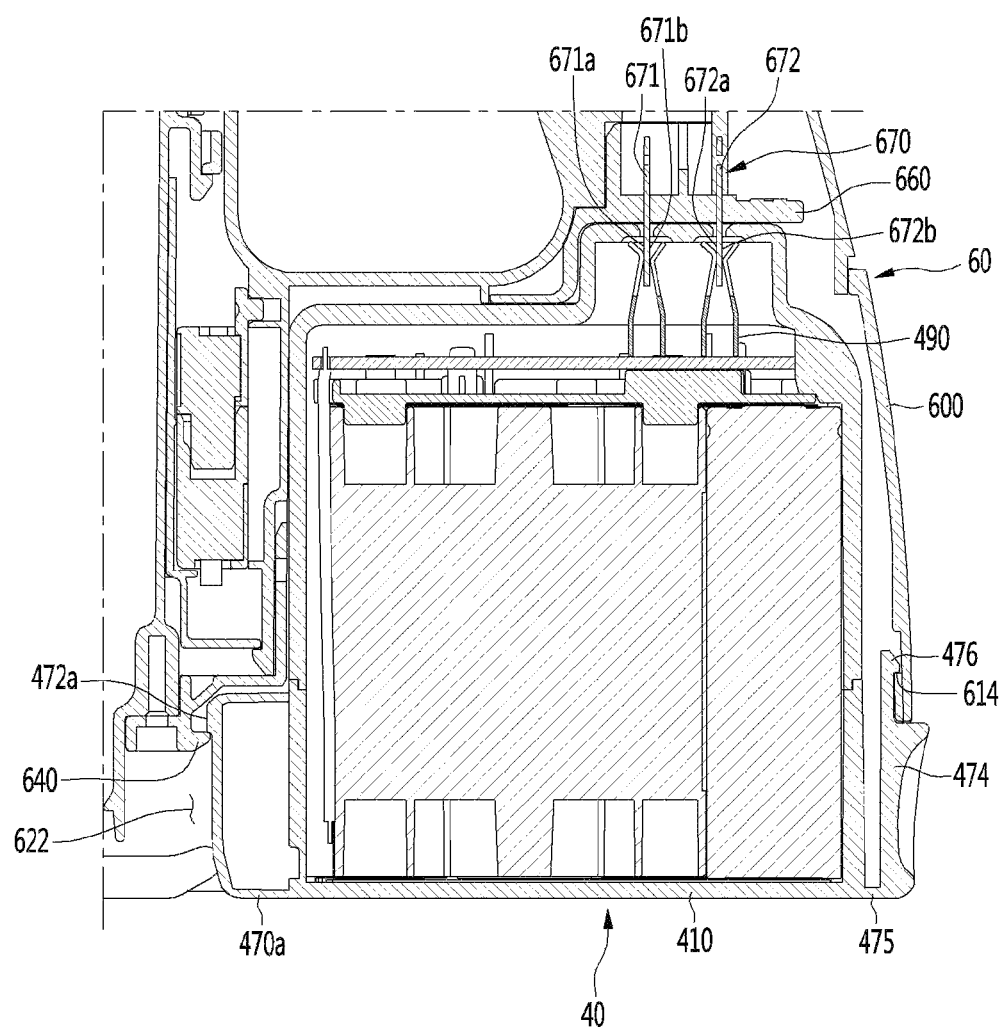
FIG. 25 is a view showing a case in which a battery according to another embodiment of the present invention is mounted on a battery housing.
Figure 26:
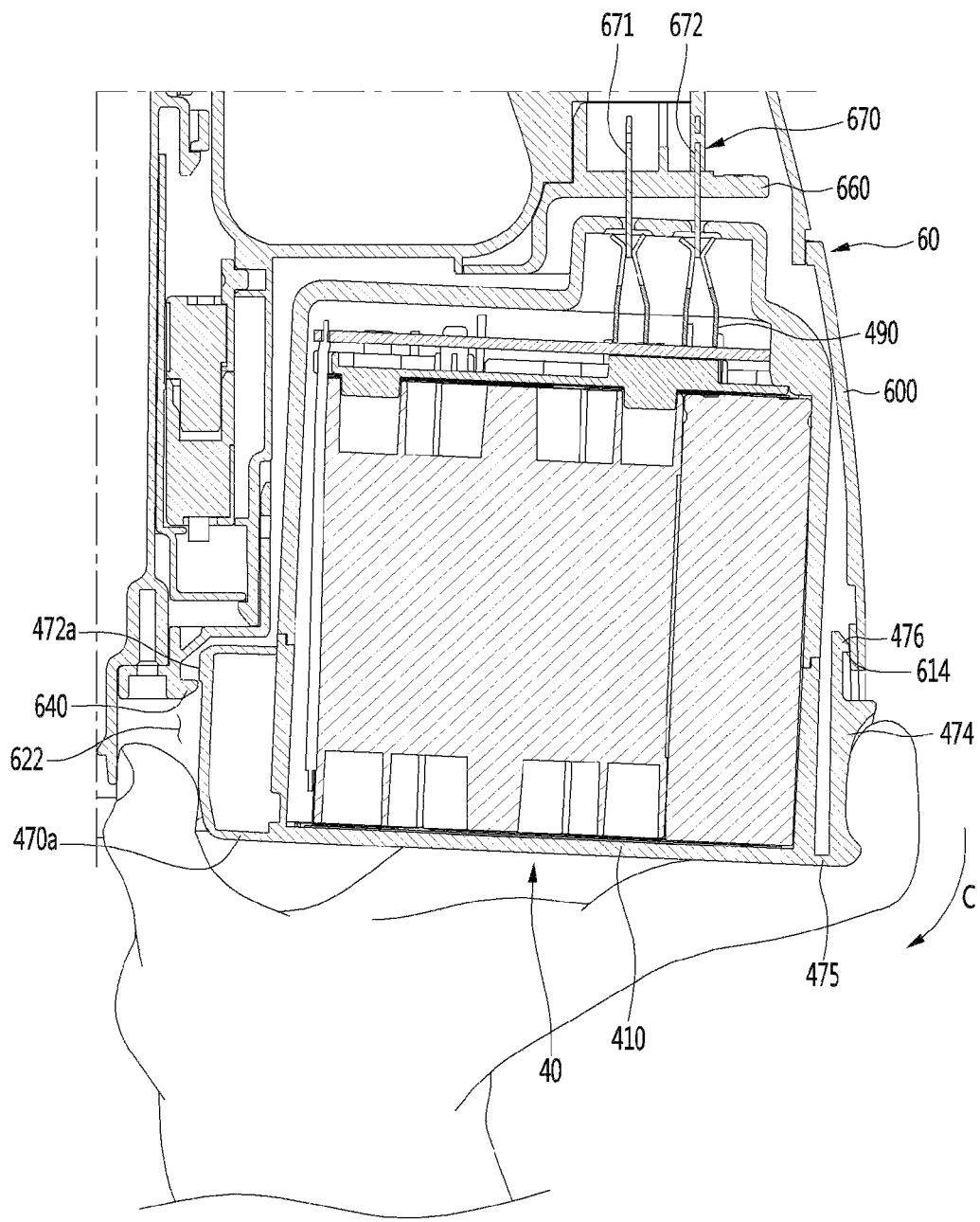
FIG. 26 is a view showing a case in which the battery is separated from the battery housing in FIG. 25.

FIG. 25 is a view showing a case in which a battery according to another embodiment of the present invention is mounted on a battery housing and FIG. 26 is a view showing a case in which the battery is separated from the battery housing in FIG. 25.

This embodiment is the same as the previous embodiment except for the structure and method of mounting and separating a battery. Accordingly, only the characteristic configuration of this embodiment is described hereafter.

Referring to FIG. 25, the battery 40 may have a plurality of coupling portions 470a and 474. The coupling portions 470a and 474 may include a first coupling portion 470a disposed on a side of the frame 410 and a second coupling portion 474 disposed on the other side of the frame 410. The first coupling portion 470a and the second coupling portion 474, for example, may be positioned opposite to each other.

The second coupling portion 474 of this embodiment is the same as the coupling portion of the first embodiment, so it is not described in detail.

The first coupling portion 470a, different from the first coupling portion 470 of the previous embodiment, is not movably coupled to the frame 410, but may be fixed to the frame 410. Alternatively, the first coupling portion 470a may be integrally formed with the frame 410. The first coupling portion 470a may have a first hook 472a.

Unlike the previous embodiment, the first hook 472a of the first coupling portion 470a can be locked to a locking rib 640 when the battery 40 is mounted in the battery housing 60 without operating the first coupling portion 470a.

Further, the first hook 472a and the locking rib 640 can be unlocked when the battery 40 is separated from the battery housing 60 without operating the first coupling portion 470a.

The battery 40 can be separated out of the battery housing 60 by pivot (or tilting) of the battery 40 in a state in which the battery 40 is received in the battery housing 60.

For example, as shown in FIG. 26, a user can pull out the second hook 476 from the coupling slot 614 by operating the second coupling portion 474 and then can pivot (tilt) the battery 40 in the direction of an arrow C while pulling it down.

Accordingly, the first hook 472a and the locking rib 640 are unlocked, so the battery 40 can be separated from the battery housing 60.

The battery terminals 490 and the second main body terminals 670 should be disconnected to separate the battery 40 from the battery housing 60.

One or more of the battery terminals 490 and the second main body terminals 670 should be elastically deformed to separate the battery 40 from the battery housing 60 by pivot.

In the present invention, the battery terminals 490 have a plurality of clip terminals, as described in the previous embodiment, for easy elastic deformation of the battery terminals 490.

The second main body terminals 670 vertical extend and the clip terminals are horizontally arranged.

The second main body terminals 670 include a plurality of terminal pins 671 and 672.

The pair of terminal pins 671 and 672 horizontally spaced apart from each other. The pair of terminal pins 671 and 672 are larger in width than thickness. The terminal pins 671 and 672 each have contact surfaces 671a, 671b and 672a, 672b that are brought in contact with the clip terminals, respectively.

The second contact surface 671b of the first terminal pin 671 and the first contact surface 672a of the second terminal pin 671 are disposed to face each other. By this arrangement, when force is applied to the terminal pins 671 and 672 perpendicularly to the contact surfaces 671a, 671b, 672a, and 672b, the terminal pins 671 and 672 can be elastically deformed.

Further, since the plurality of clip terminals is horizontally arranged, the plurality of clip terminals can be elastically deformed when the battery 40 is separated.

As shown in FIG. 36, when the battery 40 is pulled down and pivoted in the direction of the arrow C in the process of separating the battery 40, one or more of the battery terminal 490 and the second main body terminals 670 can be elastically separated, and consequently, the second main body terminals 670 can be pulled out between a pair of clip terminals of the battery terminals 490. Deformation of clip terminals is exemplified in FIG. 26.

The method of coupling the battery 40 to the battery housing 60 is opposite to the method of separating the battery 40 from the battery housing 60, so it is not described in detail.

Another embodiment is described hereafter.

A cleaner of this embodiment may further include a power control circuit that can change and provide power supplied from a battery into appropriate voltage for each of modules in the cleaner. Further, the cleaner is characterized by lowering the electric potential of the power control circuit by discharging the power accumulated in the power control circuit when the battery is separated from the battery housing.

Accordingly, this embodiment is described on the basis of these characteristics and the same configuration as those in the previous embodiments is not described.

Figure 27:
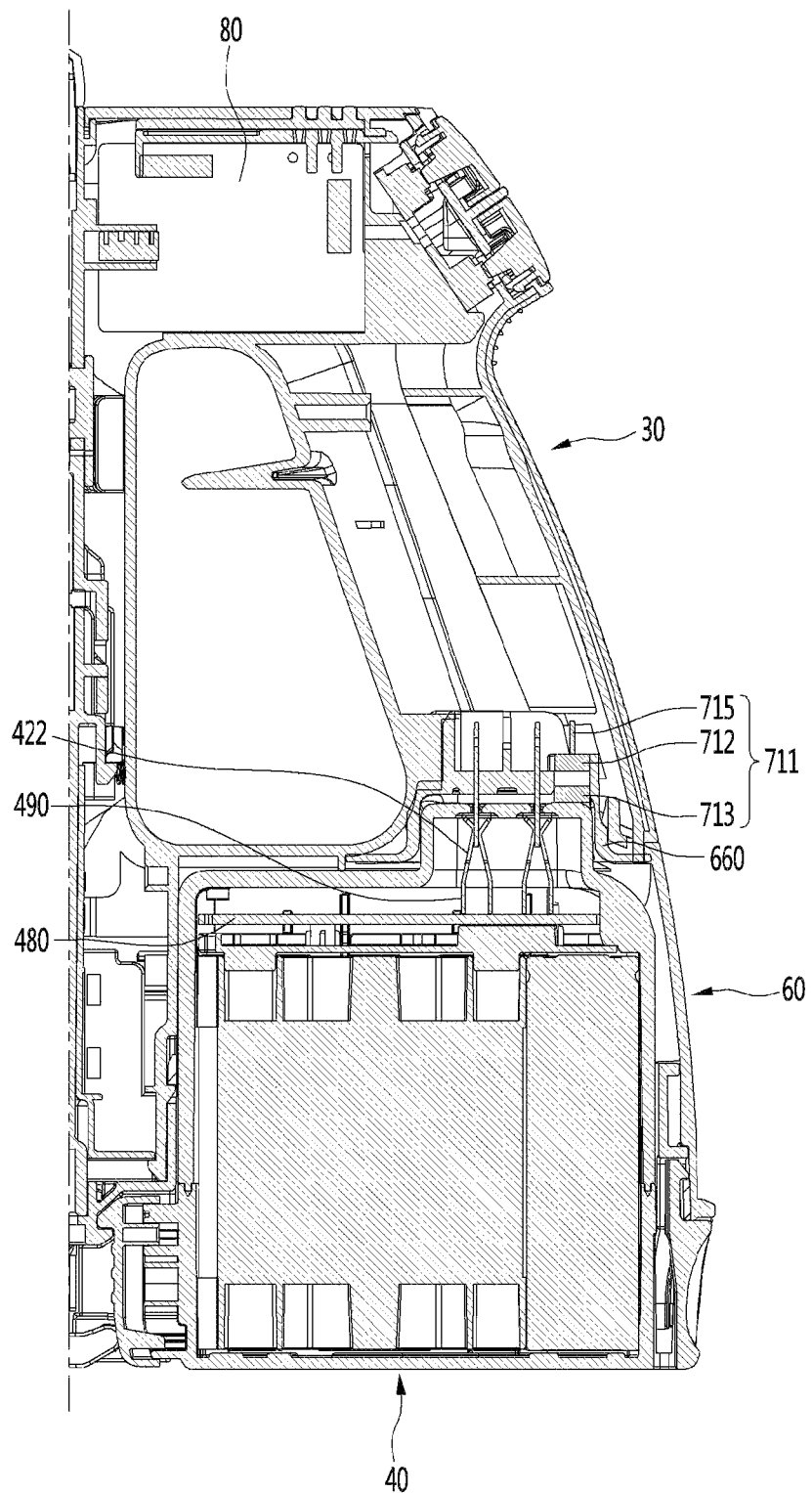
FIG. 27 is a view showing a case in which a battery according to an embodiment is mounted on a battery housing.
Figure 28:
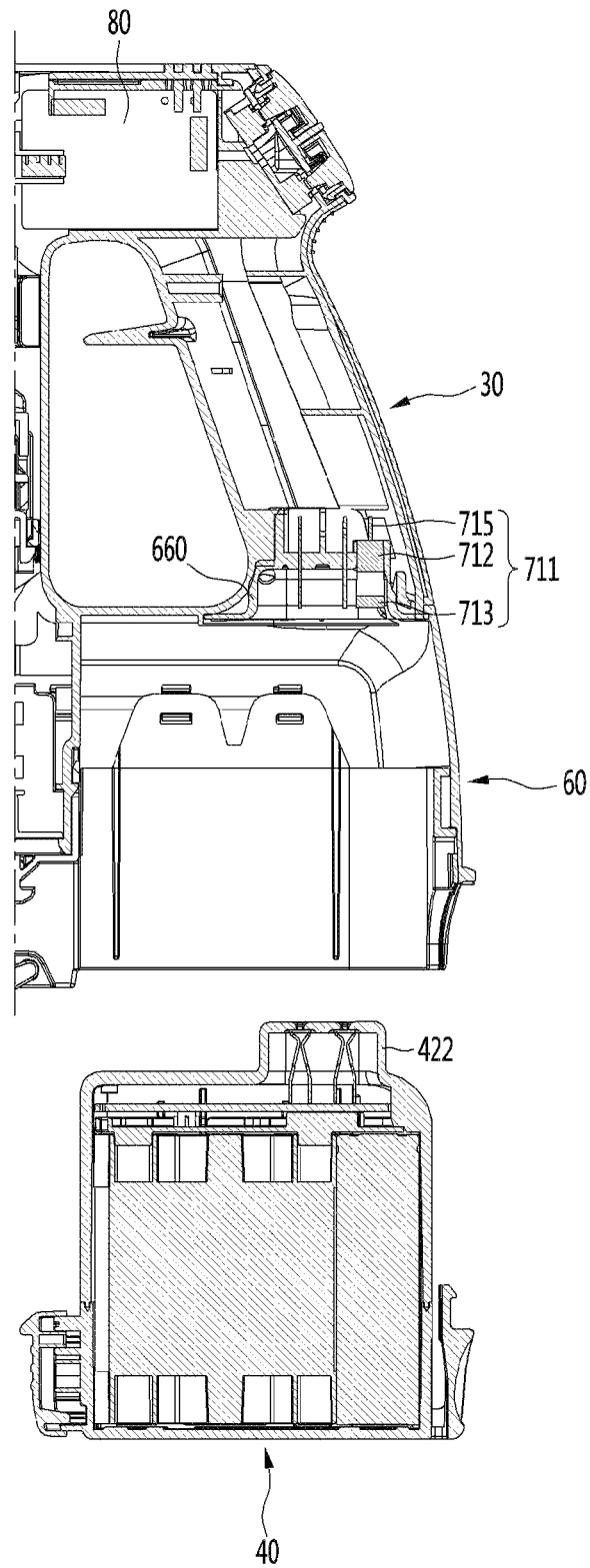
FIG. 28 is a view showing a case in which the battery according to an embodiment is separated from the battery housing.

FIG. 27 is a view showing a case in which a battery according to an embodiment is mounted on a battery housing and FIG. 28 is a view showing a case in which the battery according to an embodiment is separated from the battery housing.

Figure 29:
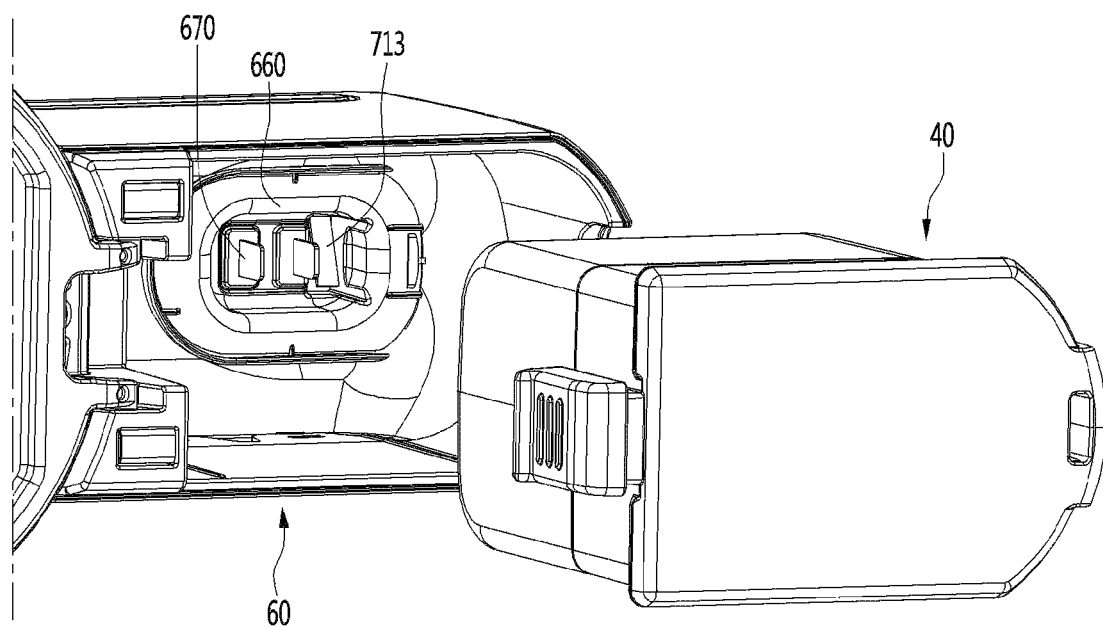
FIG. 29 is a view showing the state of a switch on the battery housing when the battery according to another embodiment is separated from the battery housing.

FIG. 29 is a view showing the state of a switch on the battery housing when the battery according to another embodiment is separated from the battery housing.

Referring to FIGS. 27 to 29, a switch 711 that can sense that the battery 40 is mounted in or separated from the receiving portion 660 may be disposed in the battery housing 60.

The switching 711 may include a switch main body 712 fixed to a side of the receiving portion 660. The switch 711 may further include a contact portion 713 rotatably coupled to a side of the switch main body 712. When the battery 40 is mounted on the battery mounting portion 60, the contact portion 713 can come in contact with a protrusion 422 of the battery 40. The contact portion 713 can be rotated in a first direction by being pressed and elastically deformed by the protrusion 422.

When the contact portion 713 is rotated in the first direction, restoring force can be accumulated in the contact portion 713. When the external force applied to the contact portion 713 is removed, the contact portion 713 can be rotated in a second direction opposite to the first direction. The switch 711 may further include a switch terminal 714 that transmits power of the battery 40 to at least one of a control unit 80 and the suction motor 20 when the contact portion 713 is rotated in the first direction.

The control unit 80 and the switch terminal 714 may be electrically connected by a first connector (not shown). The suction motor 20 and the switch terminal 714 may be electrically connected by a second connector (not shown).

When the contact portion 713 is rotated in the first direction to a predetermined position, the switch terminal 714 can be electrically connected to battery terminals 490. Accordingly, the suction motor 20 and the control unit 80 can be supplied with power from the battery 40.

When the contact portion 713 is rotated in the second direction to the initial position, the switch terminal 714 can be connected to the grounded. Accordingly, the suction motor 20 and the control unit 80 can be connected to the ground.

The cleaner 1 may further include the control unit 80 that can individually control the modules in the cleaner 1. To this end, the control unit 80 can be electrically connected to the modules of the cleaner 1.

The control unit 80 may be disposed over (in the figures) the handle unit 3. In other words, the control unit 80 may be disposed close to the second extension 320.

A process in which power is supplied to the control unit and the suction motor due to mounting and separating of the battery is briefly described.

First, the battery 40 can be mounted in the battery housing 60. The protrusion 422 of the battery 40 and the receiving portion 660 of the battery housing 60 are fitted to each other, and the protrusion 422 can press the contact portion 713 of the switch 711. When the contact portion 713 is pressed and rotated in the first direction to a predetermined position by the protrusion 422, the battery terminals 490 can be connected to at least one of the control unit 80 and the suction motor 20 by the switch terminal 715. Accordingly, the power of the battery 40 can be supplied to at least one of the control unit 80 and the suction motor 20.

On the contrary, the battery 40 can be separated from the battery housing 60. Accordingly, the force pressing the contact portion 713 of the switch 711 is removed. Accordingly, the contact portion 713 can be rotated in the second direction by the restoring force of the elastic member 714. Further, the contact portion 713 can be returned to the initial position.

When the contact portion 713 is returned to the initial position by the restoring force, the suction motor 20 and the control unit 80 can be connected to the ground. Accordingly, when at least one of the suction motor 20 and the control unit 80 has a capacitor, the charge accumulated in the capacitor can be moved and discharged to the ground.

Accordingly, even though the battery 40 is mounted back into the battery housing 60 after separated or the battery 40 that has been charged is mounted in the battery housing 60 after a long time passes, the electric potential of the suction motor 20 and the control unit 80 may be lower than the electric potential of the battery 40. Accordingly, the suction motor 20 and the control unit 80 can be easily supplied with power from the battery 40.

A process in which the charge of the capacitor of the suction motor is discharged by operation of the switch.

Figure 30:
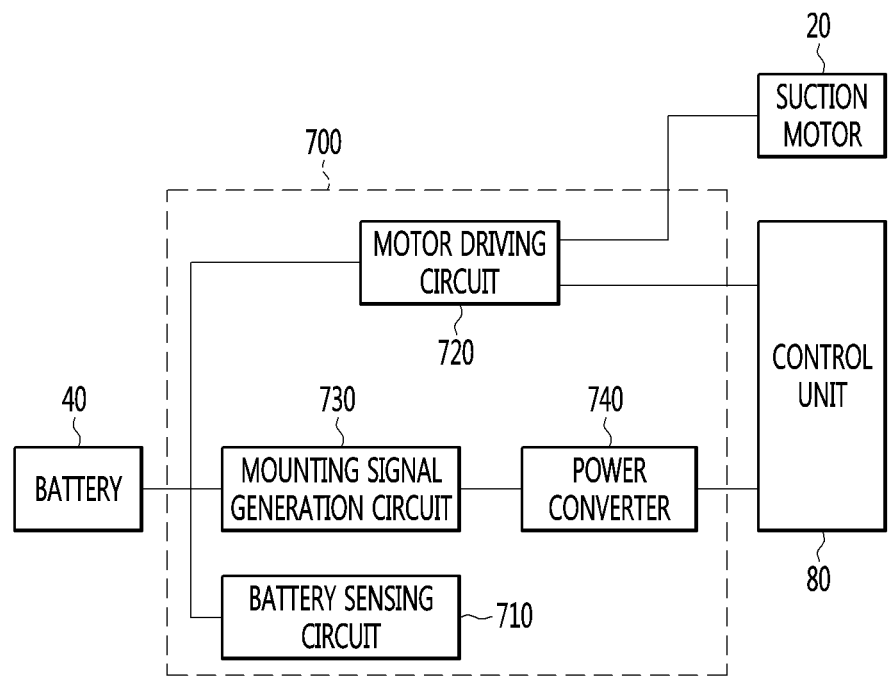
FIG. 30 is a view showing the configuration of a cleaner power control circuit according to another embodiment.

FIG. 30 is a view showing the configuration of a cleaner power control circuit according to another embodiment.

Referring to FIG. 30, the cleaner 1 may include a power control circuit 700 connecting the suction motor 20 and the control unit 80 to the battery 40.

The power control circuit 700 may include a battery sensing circuit 710 that senses that the battery 40 is mounted in the battery housing 60. When mounting of the battery 40 in the battery housing 60 is sensed, the battery sensing circuit 710 can supply power of the battery 40 to at least one of the suction motor 20 and the control unit 80.

Further, when separation of the battery 40 from the battery housing 60 is sensed, the suction motor 20 and the control unit 80 can be connected to the ground by the battery sensing circuit 710. Accordingly, a motor driving circuit 720 connected to the suction motor 20 and a mounting signal generation circuit 730 and a power converter 740 that are connected to the control unit 80 can be connected to the ground.

Accordingly, when at least one of the motor driving circuit 720, the mounting signal generation circuit 730, and the power converter 740 has a capacitor, the charge accumulated in the capacitor can be moved and discharged to the ground. The motor driving circuit 720, the mounting signal generation circuit 730, and the power converter 740 will be described below.

The power management unit 700 may further include the motor driving circuit 720 that supplies power for driving the suction motor 20. The motor driving circuit 720 can reduce noise generated by power of the battery 40 and can provide a set voltage for driving the suction motor 20 to the suction motor 20.

The power control circuit 700 may further include the mounting signal generation circuit 730 that generates a mounting signal when mounting of the battery 40 is sensed and that transmits power of the battery 40 to the control unit 80. The mounting signal generation circuit 730 can transmit the power of the battery 40 to the power converter 740.

The power converter 740 can change the voltage of the battery 40 into voltage suitable for diving the control unit 80. For example, the control unit 80 can be driven by voltage of 5V. To this end, when voltage of 12V is supplied to the power converter 740 from the battery 40, the power converter 740 can change the voltage 12V into 5V. The power converter 740, for example, may include a regulator.

The state of the cleaner power control circuit that is changed by mounting or separating of the battery into and from the battery housing is described hereafter.

Figure 31:
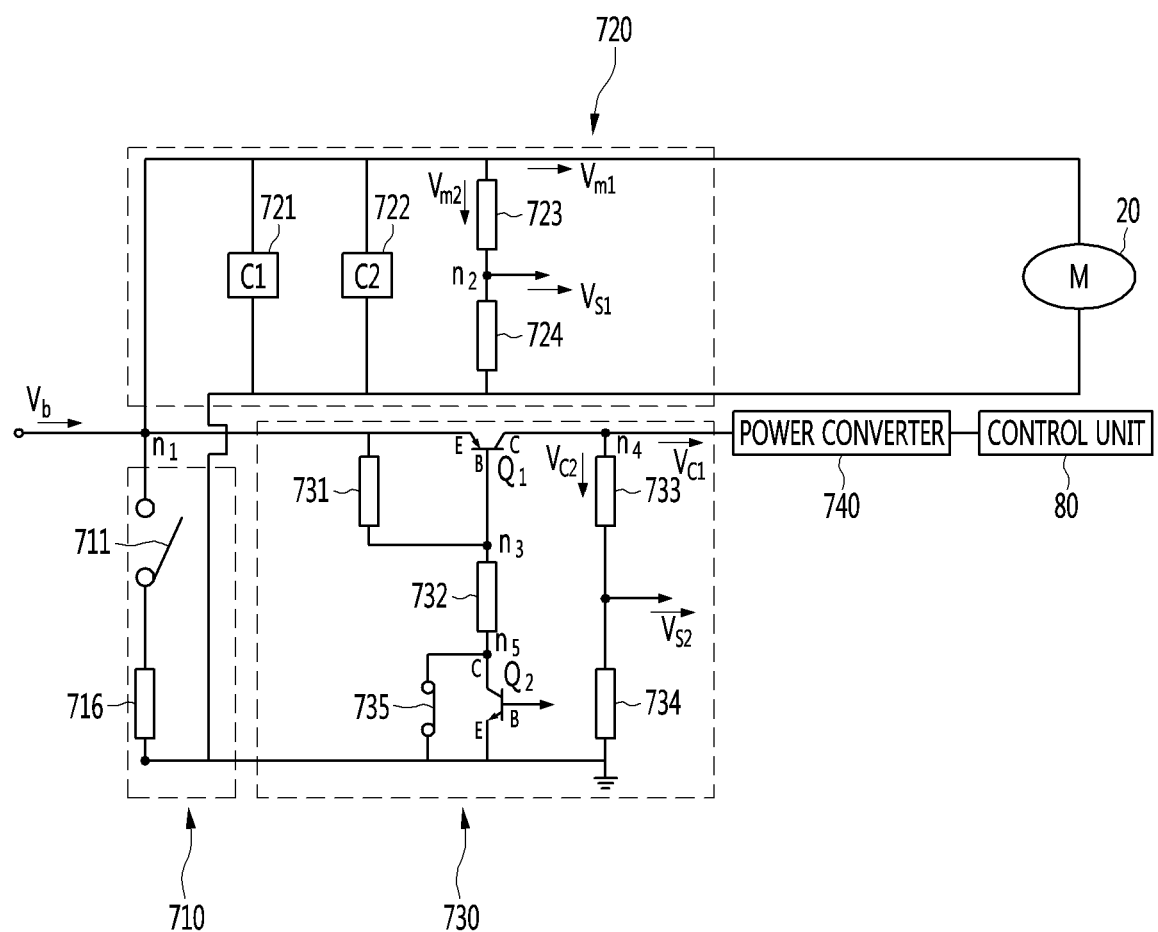
FIG. 31 is a view showing the state of the power control circuit when the switch is opened in FIG. 30.

FIG. 31 is a view showing the state of the power control circuit when the switch is opened in FIG. 30.

First, referring to FIG. 31, the battery sensing circuit 710 may include the switch 711. A side of the switch 711 may be connected to a first node n1 to which voltage Vb of the battery 40 is applied, and may be connected to the mounting signal generation circuit 730 and the motor driving circuit 720. In other words, the battery sensing circuit 710, the motor driving circuit 720, and the mounting signal generation circuit 730 may be connected to the first node n1.

The other side of the switch 711 may be connected to the other side of a switch resistance 716 having a side connected to the ground.

When the battery 40 is mounted in the battery mounting portion 60, the switch 711 can be opened. Accordingly, when the battery 40 is mounted in the battery mounting portion 60, the power of the battery 40 can be connected to the motor driving circuit 720 and supplied to the suction motor 20. Further, the power of the battery 40 can be connected to the mounting signal generation circuit 730 and the power converter 740 and supplied to the control unit 80.

The battery sensing circuit 711 may further include a first resistance 716 disposed between the first node n1 and the switch 711 or between the switch 711 and the ground. Excessive current flowing to the mounting signal generation circuit 730 can be reduced by the first resistance 716 when the switch 711 is closed. Further, it is possible to prevent an excessive voltage difference between an emitter terminal E and a base terminal B of a first transistor Q1 disposed in the mounting signal generation circuit 730. The operation of closing the switch 711 is described below.

The motor driving motor 720 may include one or more capacitors 721 and 722 for removing noise that is generated by power supplied from the battery 40. The capacitors 721 and 722 each may have a side connected to the first node n1 and the other side connected to the ground. Accordingly, an AC component noise of the power supplied from the battery 40 can be accumulated in the capacitors 721 and 722. Accordingly, the noise included in the power transmitted from the motor driving circuit 720 to the suction motor 20 and the control unit 80 can be reduced.

The motor driving circuit 720 may include a first driving resistance 723 that distributes first setting voltage for driving the suction motor 20. The first driving resistance 723 may have a side connected to the first node n1 and the other side connected to a second node n2 connected to a second driving resistance 724 connected to the input side of the control unit 80 and the ground. Accordingly, the voltage supplied from the battery 40 can be divided into first distribution voltage Vm1 and second distribution voltage Vm2 for driving the suction motor 20. Further, the first distribution voltage Vm1 can be supplied to the suction motor 20. Accordingly, the suction motor 20 can be stably driven.

The second distribution voltage Vm2 can be distributed as first signal voltage Vs1 to be input to the control unit 80 by the second driving resistance 724. When the first signal voltage Vs1 is input to the control unit 80, the control unit 80 can determine that the suction motor 20 can be driven.

The first driving resistance 723 and the second driving resistance 724 can be connected between the capacitors 721 and 722 and the suction motor 20. Accordingly, power with noise reduced is distributed by the first driving resistance 723 and drives the suction motor 20, reliability in the operation of the first suction motor 20 can be further improved.

The mounting signal generation circuit 730 may include a first transistor Q1 that is turned on or off in accordance with opening or closing of the switch 711 of the battery sensing circuit 710.

The first transistor Q1 may include an emitter terminal E, a base terminal B, and a collector terminal C. The emitter terminal E may be connected to the first node n1. When the switch 711 is opened, the power from the battery can be supplied to the emitter terminal E.

The base terminal B of the first transistor Q1 may be connected with a third node N3 connected to the ground. The first transistor Q1 can be turned on when the base terminal B is lower in voltage than the emitter terminal E. A first signal resistance 731 may be disposed between the emitter terminal E and the base terminal B to turn on the first transistor Q1. In other words, the first signal resistance 731 may be connected between the first node n1 and the third node n3. Accordingly, voltage for operating the first transistor Q1 can be supplied to the emitter transistor E by the first signal resistance 731.

The collector terminal C of the first transistor Q1 can be connected to a fourth node n4. When the first transistor Q1 is turned on, the power supplied from the battery 40 can be transmitted to the fourth node n4.

Meanwhile, the mounting signal generation circuit 730 may further include a second transistor Q2 that can turn on or off the first transistor Q1.

The second transistor Q2 may include a collector terminal C, a base terminal B, and an emitter terminal E. The collector terminal C of the second transistor Q2 can be connected to a fifth node n5. A second signal resistance 732 for operating the second transistor Q2 may be disposed between the third node n3 and the fifth node n5. Accordingly, the second signal resistance 732 is connected to the collector terminal C, so it can be supplied with power distributed by the first signal resistance 731 and the second signal resistance 732. The base terminal B is connected to the input side of the control unit 80, so it can receive power for turning on the second transistor Q2 from the control unit 80. The emitter terminal E of the second transistor Q2 may be connected to the ground.

When the second transistor Q2 is turned on by the control unit 80, the base B of the first transistor Q1 can be connected to the ground. Accordingly, the first transistor Q1 can be turned on.

The mounting signal generation circuit 730 may further include a second switch 735 that enables a user to selectively turn on or off the second transistor Q2. A side of the second switch 735 may be connected to the collector C of the second transistor Q2. In other words, a side of the second switch 735 may be connected to the fifth node n5. The other side of the second switch 735 may be connected to the ground. Accordingly, when a user turns on the second switch 735 after the battery 40 is mounted in the battery housing 60, the second transistor Q2 can be turned on. Further, as the second transistor Q2 is operated, the first transistor Q1 can be turned on. On the contrary, when a user turns off the second switch 735 even though the battery 40 is mounted in the battery housing 60, the second transistor Q2 can be turned off. Accordingly, the first transistor Q1 can be turned off.

In summary, whether to supply the power of the battery 40 to the control unit 80 can be selectively determined by a user. Accordingly, it is possible to prevent consumption of the battery 40 when the cleaner 1 is not used. Accordingly, a user can reduce power consumption and use the battery 40 longer.

The second switch 735, for example, may be the operation unit 326 (see FIG. 3) on the handle 30.

The mounting signal generation circuit 730 may further include a third signal resistance 733 that distributes and transmits voltage transmitted to the fourth node n4 to the power converter 740 and the control unit 80. The voltage supplied from the battery 40 can be divided into first distribution voltage Vc1 for driving the control unit 80 and second distribution voltage Vc2 for transmitting a mounting signal to the control unit 80 by the third signal resistance 733. The first distribution voltage Vc1 can be transmitted to the power converter 740.

The second distribution voltage Vm2 can be distributed as second signal voltage Vs2 to be input to the control unit 80 by the fourth signal resistance 734. When the second signal voltage Vs2 is input to the control unit 80, the control unit 80 can determine whether the mounting signal generation circuit 730 is normally operated.

The power converter 740 can be supplied with power for driving the control unit 80 from the mounting signal generation circuit 730. The power may be the first distribution voltage Vc1. The power converter 740 can change the voltage of the power transmitted from the mounting signal generation circuit 730 into setting voltage for driving the control unit 80. The voltage changed by the power converter 740 can be transmitted to the control unit 80. Accordingly, the control unit 80 can be stably driven.

Figure 32:
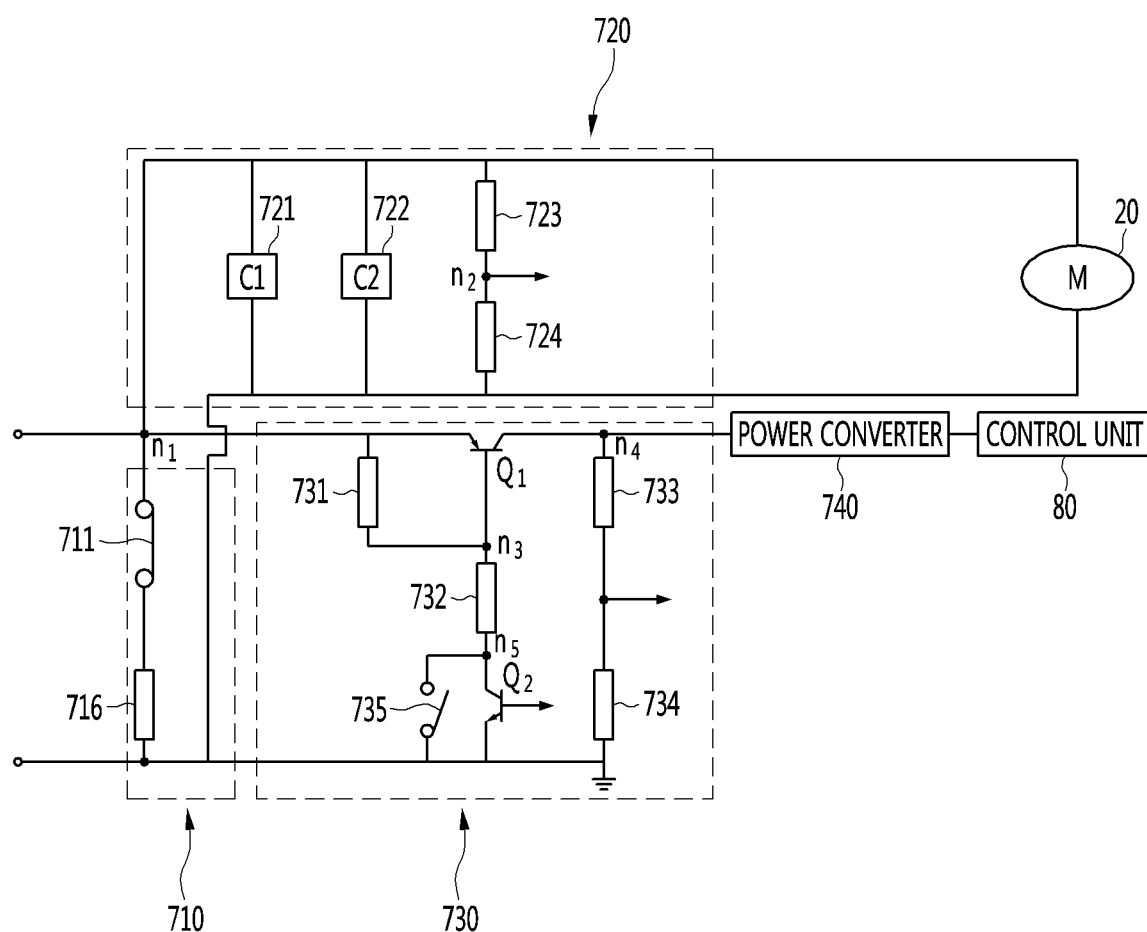
FIG. 32 is a view showing the state of the power control circuit when the switch is closed.

FIG. 32 is a view showing the state of the power control circuit when the switch is closed.

When the battery 40 is separated from the battery mounting portion 60, the switch 711 can be closed. A motor driving circuit 720 connected to the suction motor 20 and a mounting signal generation circuit 730 and a power converter 740 that are connected to the control unit 80 can be connected to the ground. Accordingly, the charge accumulated in the capacitors 721 and 722 of the motor driving circuit 720 can be moved and discharged to the ground. Accordingly, the electric potential of the motor driving circuit 720 can drop.

The battery 40 can be operated in a setting mode that decreases first setting electric potential of the battery 40 to second setting electric potential lower than the first setting electric potential in a normal state in order to reduce natural discharge of the battery 40 when reference time passes after the battery 40 is separated from the battery housing 60 or when reference time passes after the battery 40 is fully charged on a cradle and then separated from the cradle. The second setting electric potential of the battery 40 may be lower than the electric potential when the capacitors 721 and 722 of the motor driving circuit 720 is charged by the battery 40.

Meanwhile, as the battery 40 is separated from the battery housing 40 of the cleaner 1, the charge accumulated in the capacitors 721 and 722 can be fully discharged. Accordingly, even though the battery 40 that is operated in the setting mode is mounted in the battery housing 60, the electric potential of the suction motor 20 may be lower than the electric potential of the battery 40. Accordingly, the suction motor 20 can be easily supplied with power from the battery 40.

What is claimed is:

1. A battery comprising:
   a frame that defines an external shape of the battery, the frame comprising a first frame and a second frame that is coupled to a lower portion of the first frame;
   a plurality of battery cells received in the frame, each of the plurality of battery cells having a longitudinal axis that extends vertically in an extension direction with respect to a ground surface inside of the second frame;
   a battery holder that surrounds the plurality of battery cells, the battery holder including a separation wall that divides the plurality of battery cells into a plurality of rows;
   a battery management unit configured to manage a voltage of the plurality of battery cells, the battery management unit comprising a circuit board that is spaced apart from the plurality of battery cells in the extension direction;

a barrier that is disposed between the plurality of battery cells and the battery management unit, that faces anodes and cathodes of the plurality of battery cells in the extension direction, and that blocks the anodes and the cathodes of the plurality of battery cells from the circuit board;

a first coupling portion disposed at a first side of the second frame, the first coupling portion comprising a first hook; and a second coupling portion disposed at a second side of the second frame opposite to the first side, the second coupling portion comprising a second hook, wherein the longitudinal axis of each of the plurality of battery cells crosses the circuit board and the barrier in the extension direction.

2. The battery of claim 1, wherein an upper end of the first hook is disposed lower than an upper end of the second hook.

3. The battery of claim 1, wherein the first hook is disposed closer to a bottom surface of the first frame than to a bottom surface of the second frame.

4. The battery of claim 1, wherein the second hook is disposed higher than a bottom surface of the first frame.

5. The battery of claim 1, wherein the first hook is separably coupled to the second frame.

6. The battery of claim 1, wherein the first coupling portion is movably coupled to an outer side of the second frame.

7. The battery of claim 1, wherein the first coupling portion is elastically supported by an elastic member.

8. The battery of claim 7, wherein the elastic member is disposed between the first coupling portion and the second frame.

9. The battery of claim 1, wherein the second coupling portion and the second frame are formed as one body.

10. The battery of claim 1, wherein the second coupling portion is elastically deformed by external force.

11. A battery comprising:

a frame that defines an external shape of the battery, the frame comprising a first frame and a second frame that is coupled to a lower portion of the first frame;

a plurality of battery cells received in the frame, each of the plurality of battery cells having a longitudinal axis that extends vertically in an extension direction with respect to a ground surface inside of the second frame;

a battery holder that surrounds the plurality of battery cells, the battery holder including a separation wall that divides the plurality of battery cells into a plurality of rows;

a battery management unit configured to manage a voltage of the plurality of battery cells, the battery management unit comprising a circuit board that is spaced apart from the plurality of battery cells in the extension direction;

a barrier that is disposed between the plurality of battery cells and the battery management unit, that faces anodes and cathodes of the plurality of battery cells in the extension direction, and that blocks the anodes and the cathodes of the plurality of battery cells from the circuit board, a first coupling portion disposed at a first side of the second frame, the first coupling portion comprising a first hook; and a second coupling portion disposed at a second side of the second frame, the second coupling portion comprising a second hook, wherein the first frame comprises a protrusion portion that protrudes from a top surface of the first frame and that defines terminal holes configured to receive terminals, and wherein the longitudinal axis of each of the plurality of battery cells crosses the circuit board and the barrier in the extension direction.

12. The battery of claim 11, wherein the terminal holes pass through the top surface of the protrusion portion.

13. The battery of claim 12, wherein the protrusion portion is positioned at a side from a center of the first frame.

14. The battery of claim 13, wherein the protrusion portion is positioned closer to the second coupling portion than to the first coupling portion.

15. A battery comprising:

a frame that defines an external shape of the battery, the frame comprising a first frame and a second frame that is coupled to a lower portion of the first frame;

a plurality of battery cells received in the frame, each of the plurality of battery cells having a longitudinal axis that extends vertically in an extension direction with respect to a ground surface inside of the second frame;

a battery holder that surrounds the plurality of battery cells, the battery holder including a separation wall that divides the plurality of battery cells into a plurality of rows;

a battery management unit configured to manage a voltage of the plurality of battery cells, the battery management unit comprising a circuit board that is spaced apart from the plurality of battery cells in the extension direction;

a barrier that is disposed between the plurality of battery cells and the battery management unit, that faces anodes and cathodes of the plurality of battery cells in the extension direction, and that blocks the anodes and the cathodes of the plurality of battery cells from the circuit board, a first coupling portion disposed at a first side of the second frame, the first coupling portion comprising a first hook; and a second coupling portion disposed on a second side of the second frame, the second coupling portion comprising a second hook, wherein the second frame includes contact ribs that are in contact with the plurality of battery cells in the battery holder, and wherein the longitudinal axis of each of the plurality of battery cells crosses the circuit board and the barrier in the extension direction.

16. The battery of claim 15, wherein the contact ribs are disposed on an inner surface of the second frame.

17. The battery of claim 16, wherein the contact ribs are rounded with a curvature corresponding to a curvature of an outer surface of the plurality of battery cells.

18. The battery of claim 16, wherein the contact ribs are five, and wherein at least of two contact ribs are disposed at corners of the inner surface of the second frame.

19. The battery of claim 15, wherein an edge of the first coupling portion and an edge of the second coupling portion define an overall length of the battery.

20. The battery of claim 15, wherein the second frame comprises a seat portion disposed at a top surface of the second frame and configured to support a lower end of the first frame,
   wherein the first hook is disposed below the seat portion, and
   wherein the second hook is disposed above the seat portion.

\* \* \* \* \*